Sept. 15, 1925.

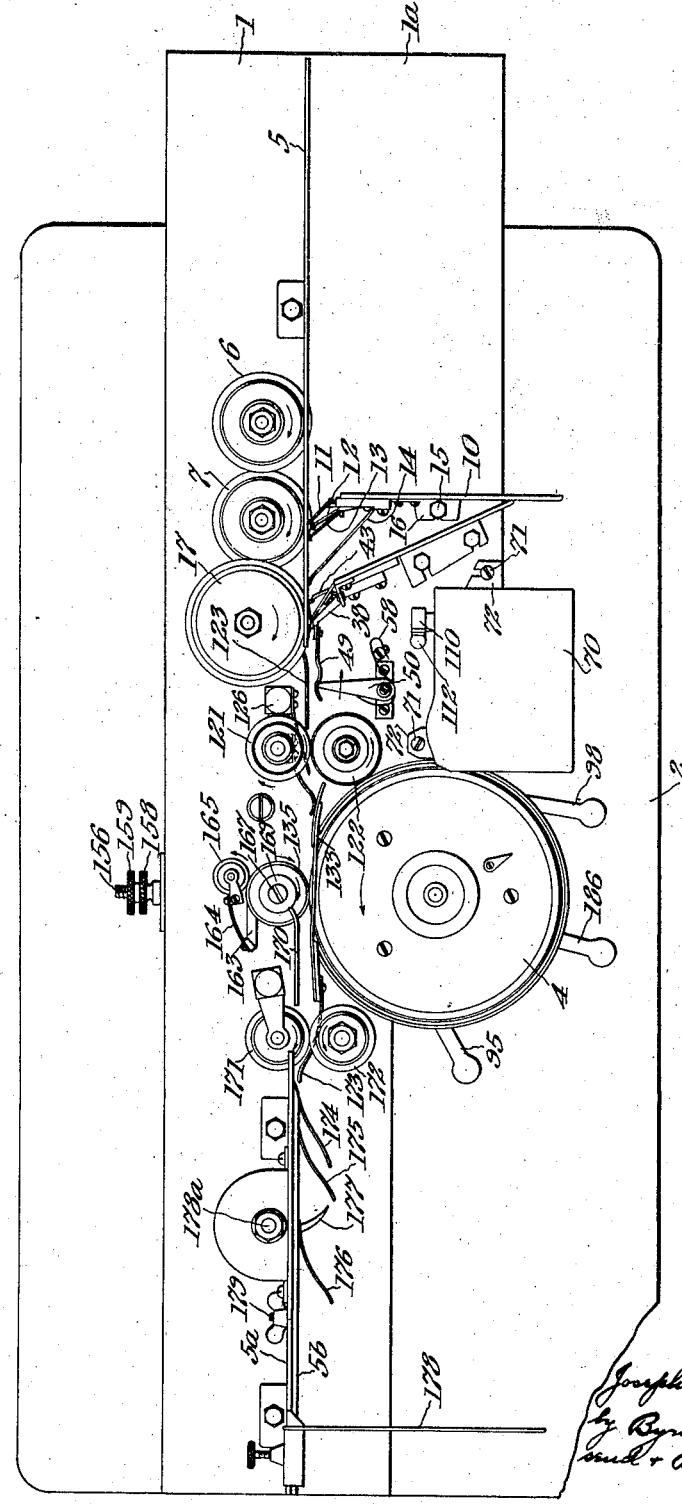

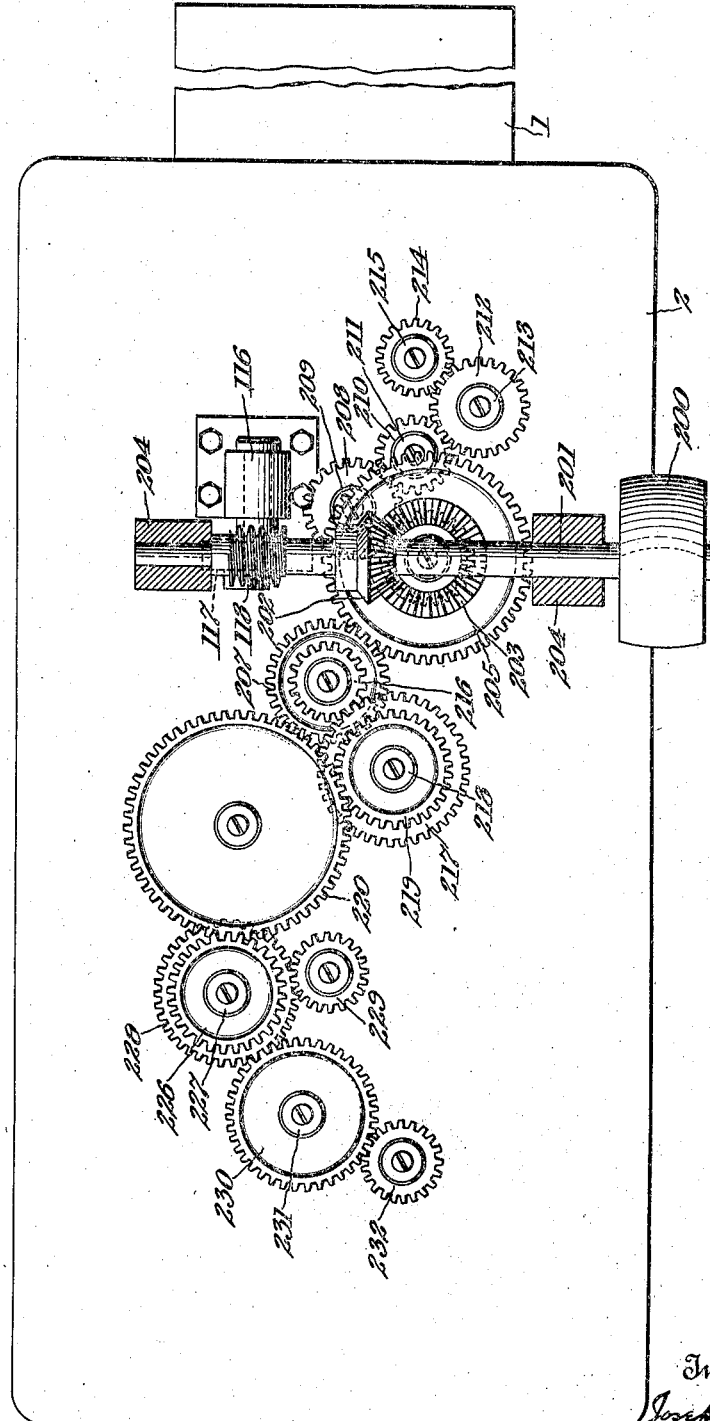

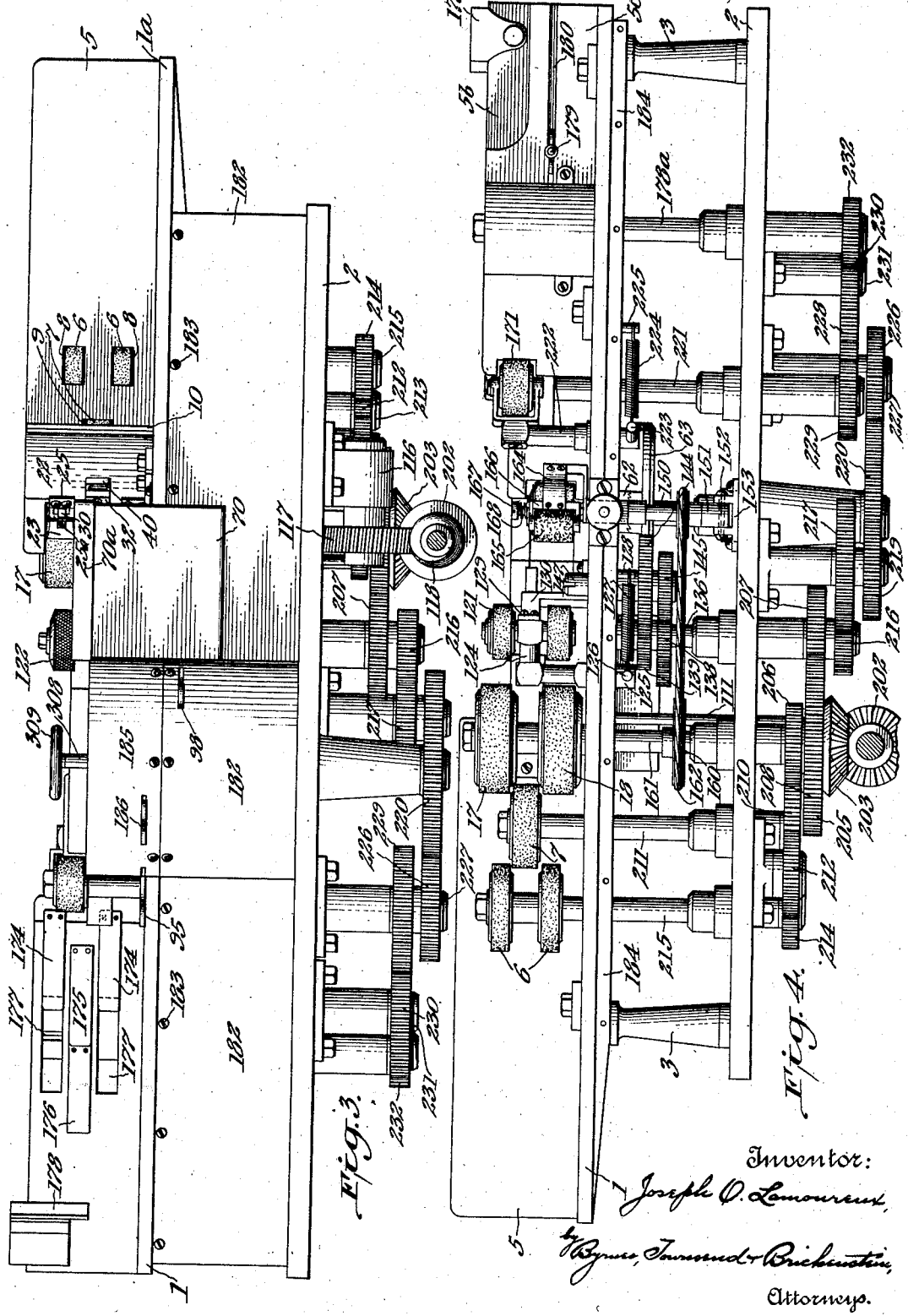

J. O. LAMOUREUX

STAMP CANCELING MACHINE

Filed Dec. 7, 1921

Inventor:
Joseph O. Lamoureux,
by Byrnes, Townsend + Brickenstein,
Attorneys.

Sept. 15, 1925.
J. O. LAMOUREUX
1,554,104
STAMP CANCELING MACHINE
Filed Dec. 7, 1921　　12 Sheets-Sheet 5
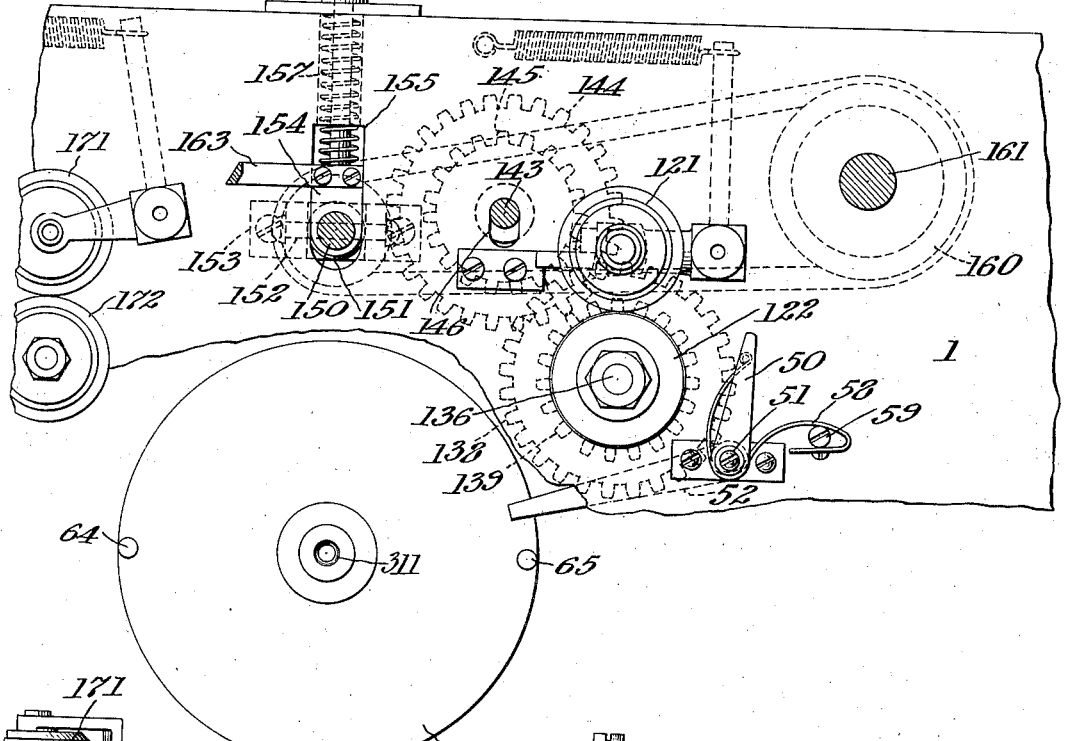
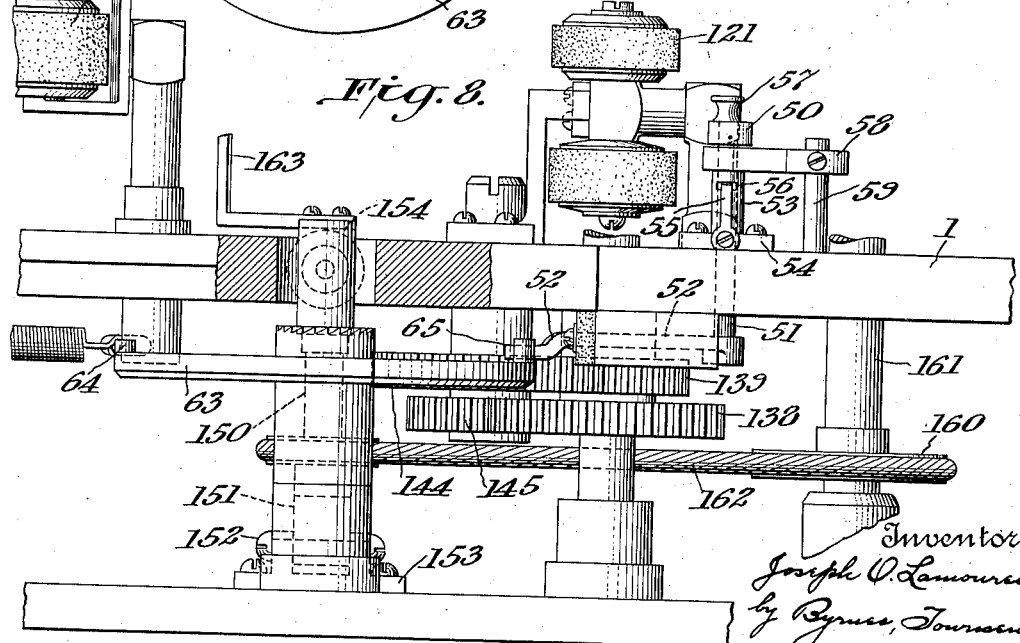

Sept. 15, 1925.
J. O. LAMOUREUX
1,554,104
STAMP CANCELING MACHINE
Filed Dec. 7, 1921    12 Sheets-Sheet 6
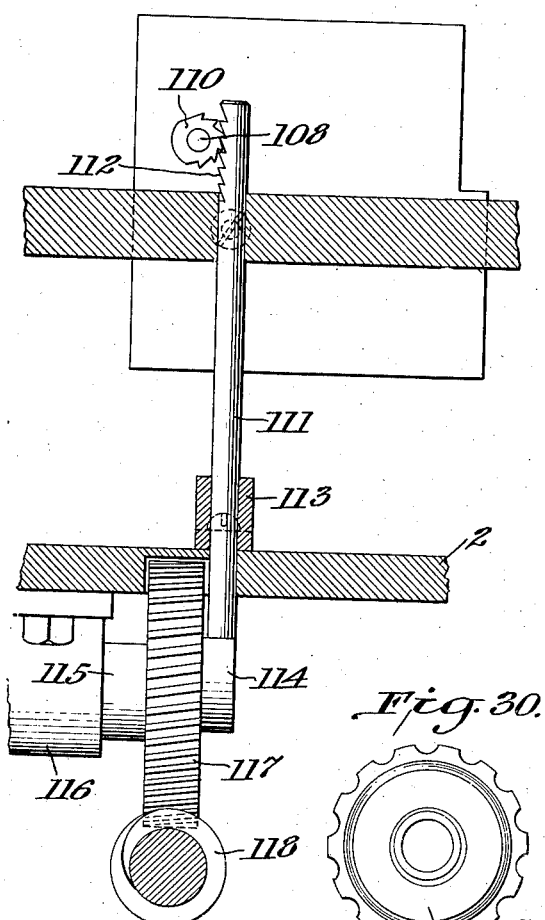
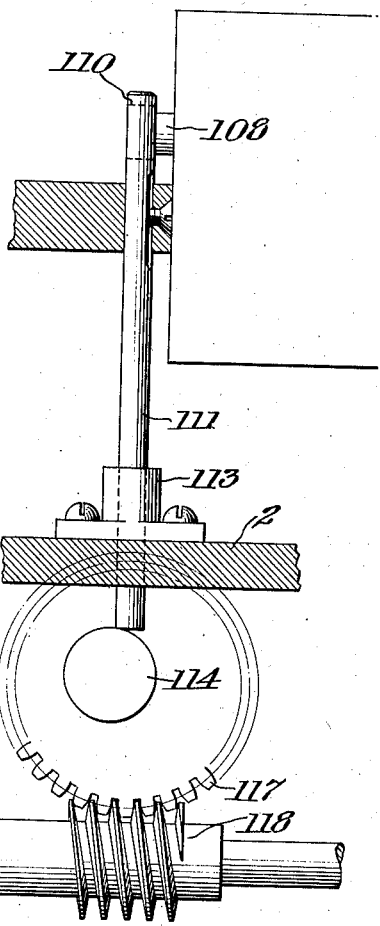
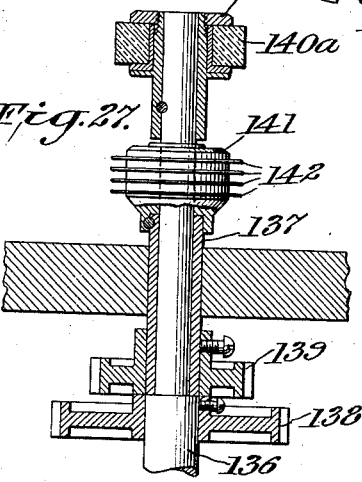
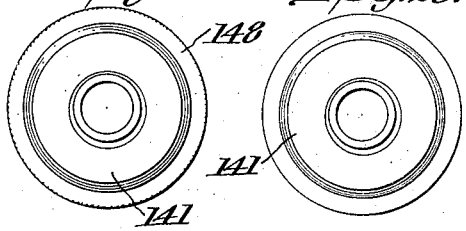

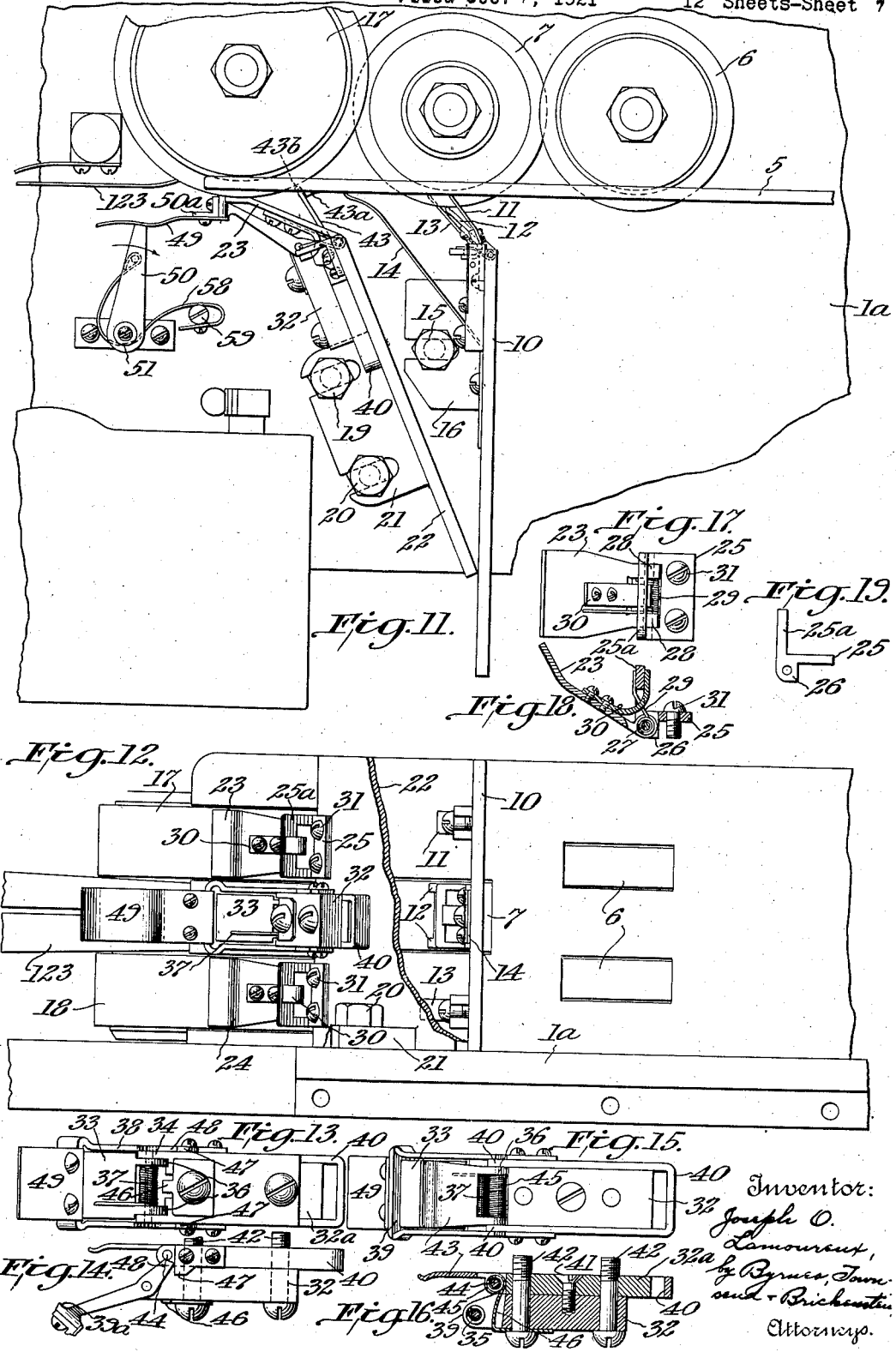

Sept. 15, 1925.　　　　J. O. LAMOUREUX　　　　1,554,104
STAMP CANCELING MACHINE
Filed Dec. 7, 1921　　　12 Sheets-Sheet 9
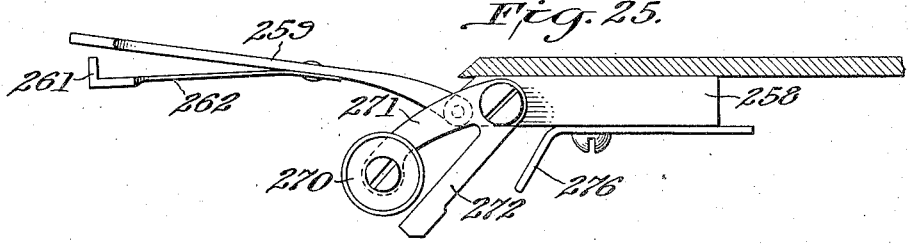
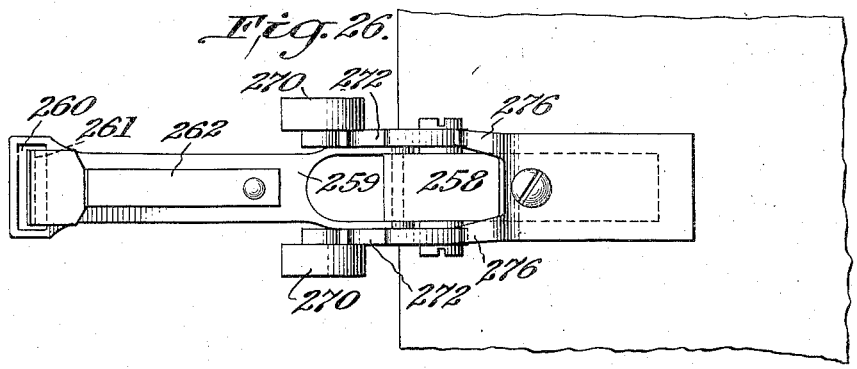

Sept. 15, 1925.

J. O. LAMOUREUX

STAMP CANCELING MACHINE

Filed Dec. 7, 1921

Inventor:
Joseph O. Lamoureux,
by Byrnes, Townsend & Brickenstein
Attorneys.

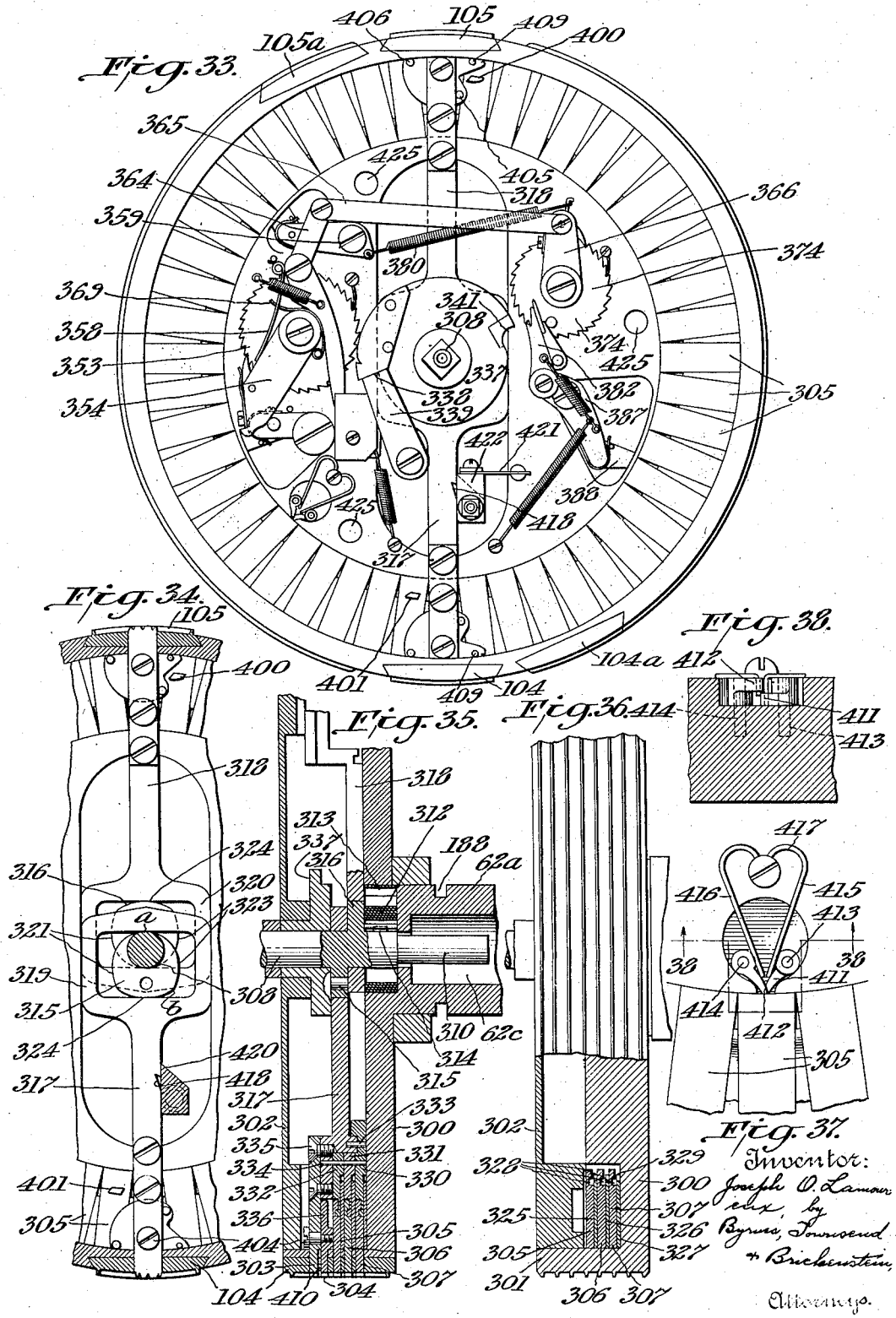

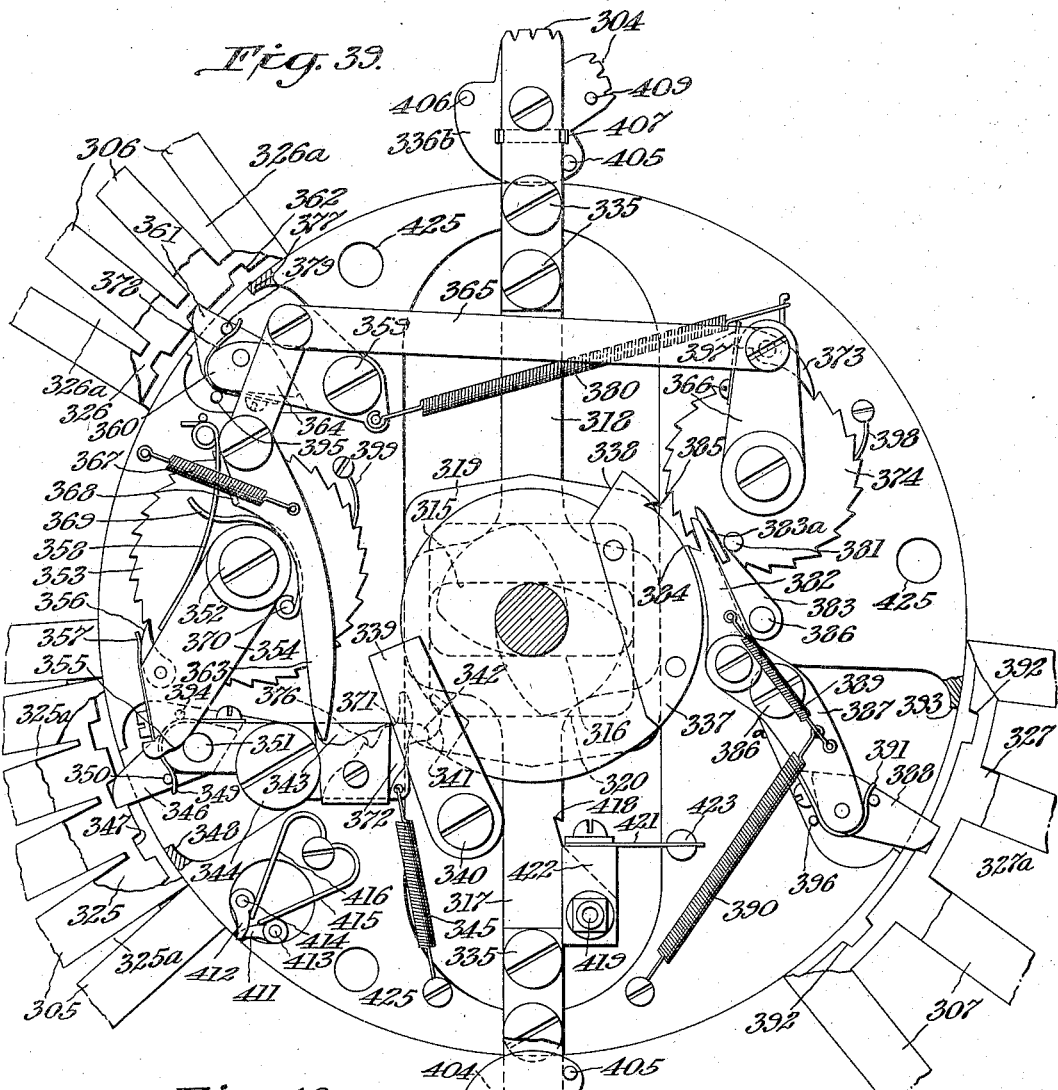

Patented Sept. 15, 1925.

1,554,104

UNITED STATES PATENT OFFICE.

JOSEPH OMER LAMOUREUX, OF MONTREAL, QUEBEC, CANADA.

STAMP-CANCELING MACHINE.

Application filed December 7, 1921. Serial No. 520,632.

*To all whom it may concern:*

Be it known that I, JOSEPH OMER LAMOUREUX, a subject of the King of Great Britain, residing at Montreal, Province of Quebec, Canada, have invented certain new and useful Improvements in Stamp-Canceling Machines, of which the following is a specification.

This invention relates to stamp-canceling machines.

An efficient stamp-canceling machine must or should have many properties to satisfy all requirements imposed upon it.

Since a machine of this type is primarily intended as a time-saving device, it should have a high working speed. Its efficiency therefore is, so far as this factor is concerned, proportional to the number of letters that can be effectively canceled per unit of time.

A letter or other piece to be canceled, is effectively canceled only when the stamp is completely destroyed or made unfit for further use. Every stamp-canceling machine has of course as its primary and ultimate object the effective cancelation of the stamp, but so far as I am advised, all machines in use up to the present time have mechanical defects and insufficiencies which prevent a practical attainment of the object. In many instances as high as 40% of the stamps are either not canceled at all or only inefficiently canceled. A slight shifting of the cancelation mark relatively to the stamp leaves the stamp unimpaired and available for further use.

It is a principal object of this invention to provide a stamp-canceling machine which normally operates at a high speed to effectively cancel every stamp placed in approximately the usual and proper position on a letter.

It is a more specific object to provide in a machine having a printing disk or roller and means for feeding the pieces to the disk, mechanism for positively and reliably controlling the positioning of the pieces relatively to the disk.

Another specific object is the provision of feeding mechanism, in general, operating to deliver the pieces separately, one by one, to the disk in substantially the identical relation thereto.

Another object is a feeding mechanism associated with a plurality of separating devices correlated to each other and to the feeding mechanism to effect the separation of the pieces in transit to the printing disk.

Another main object of the invention is the provision of a printing disk having a plurality of canceling means occupying definite angular positions on the periphery thereof and mechanism for successively delivering to the disk pieces to be canceled in predetermined relation to successive canceling means.

Another main object is the provision of a printing disk having a plurality of canceling means and means for selectively controlling the rate of feed to the disk to either bring a single piece into contact with a single canceling means during one revolution of the disk or to successively bring pieces into contact with the different canceling means respectively, depending on the length of the pieces to be canceled.

Another correlated object is to provide inking mechanism and means for selectively controlling it to operate it intermittently to apply ink to a distinct portion or a plurality of distinct portions of the periphery of the printing disk, or to operate it to continuously apply ink to the whole periphery of the disk.

Another main object is the provision of a printing disk carrying variable indicia such as the day and time of the day to be stamped on the pieces, and means for changing with facility the indicia and more particularly for changing the indicia during the operation of the machine.

Various other objects will appear from the detail description.

The general object of the invention is the provision of a stamp-canceling machine of substantially universal application, high speed and precision of operation.

For a full understanding of the principles of operation, the construction and the functional characteristics of the invention reference is had to the accompanying drawings in which Fig. 1 is a plan view of a machine embodying the invention;

Fig. 2 is a bottom plan view thereof;

Fig. 3 is a front view thereof;

Fig. 4 is a rear view thereof;

Fig. 7 is another fragmentary plan view, certain parts being shown in section;

Fig. 8 is a side view of the construction shown in Fig. 7, parts being shown in section;

Fig. 9 is a vertical section showing certain detail;

Fig. 10 is a section at right angle to that shown in Fig. 9;

Fig. 11 is a fragmentary plan view showing certain detail;

Fig. 12 is a side view thereof, part being broken away;

Fig. 13 is a side view of certain detail shown in Figs. 11 and 12;

Fig. 14 is a plan view thereof;

Fig. 15 is a bottom plan view thereof;

Fig. 16 is a section therethrough;

Fig. 17 is a side view of other detail shown in Figs. 11 and 12;

Fig. 18 is a section therethrough;

Fig. 19 is a side view of a part thereof;

Fig. 25 is a plan view on a larger scale of other detail shown in Figs. 20 and 21;

Fig. 26 is a side view thereof;

Fig. 27 is a sectional view of a construction which may be embodied in the machine;

Figs. 28, 29 and 30 are plan views of different forms of a detail appearing in Fig. 27;

Fig. 33 is a plan view of the printing disk, the cover being removed;

Fig. 34 is a fragmentary horizontal section, certain parts being removed;

Fig. 35 is a fragmentary vertical section through the disk;

Fig. 36 is an edge view of the disk and a fragmentary section on a line at right angle to the section in Fig. 35;

Fig. 37 is a plan view of a detail;

Fig. 38 is a section on line 38—38, Fig. 37;

Fig. 39 is another plan view of the disk various parts being removed; and

Fig. 40 is a plan view of a detail.

Having reference to Figs. 1–4, 1 represents a platform upon which the principal operating mechanism is disposed and 2 is a plate held by means of studs 3 in spaced parallel relation to platforms 1 and affording a support for the transmission mechanism required for the operation of the machine.

Figure 31:
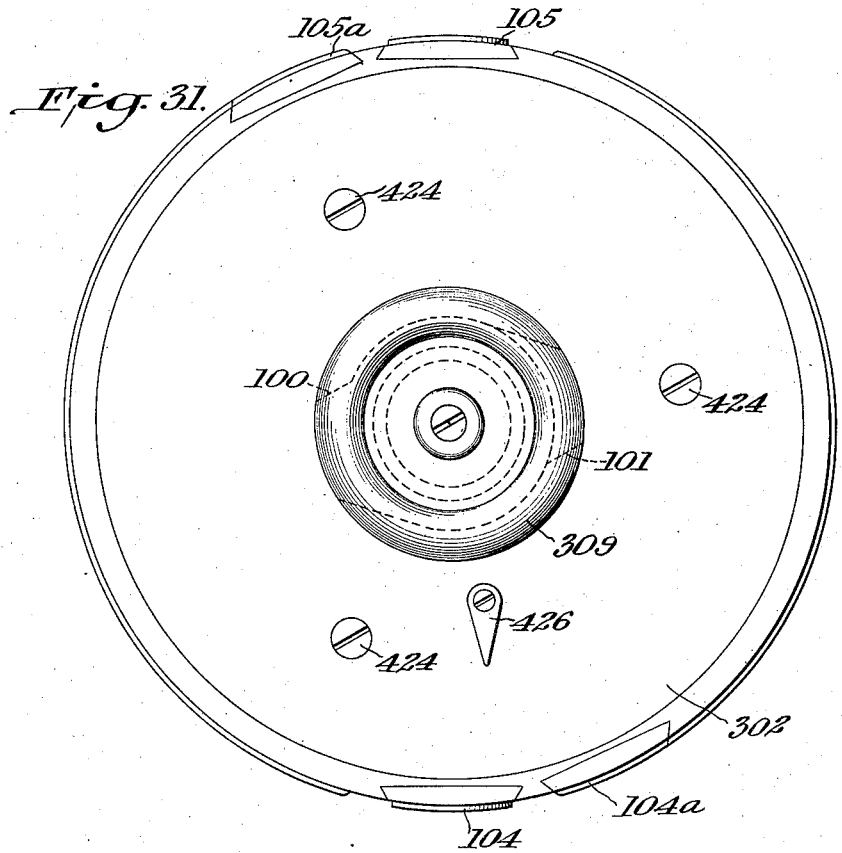
Fig. 31 is a plan view of the printing disk.
Figure 32:
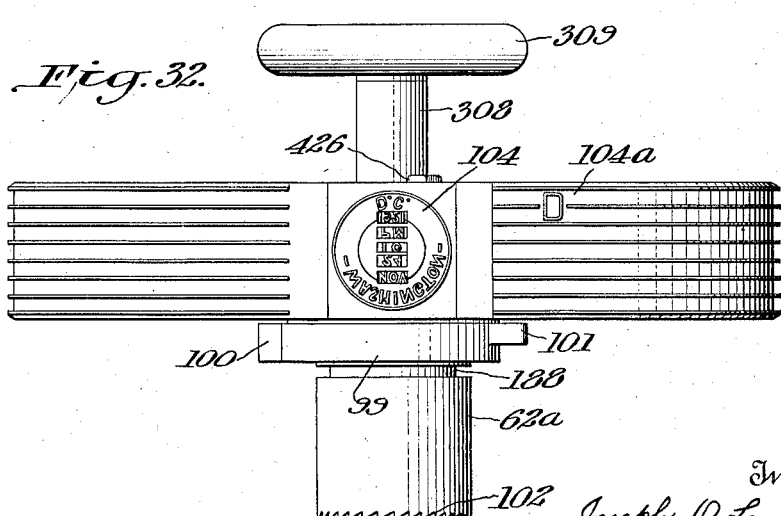
Fig. 32 is an end view thereof.

The principal element of the machine is the printing disk or roller 4 which, as will be more fully pointed out, is continuously rotated. This disk has upon its periphery a plurality of distinct printing elements for canceling letters or other pieces of mail. In the present embodiment I prefer to use two main stamps or dies 104 and 105 for marking the name of the postoffice, date and hour as is usual and collateral stamps 104$^a$ and 105$^a$ for applying collateral cancelation marks see Figs. 31 and 32. The main dies are angularly spaced from each other 180° and the collateral stamps are disposed in symmetrical position thereto, as indicated in Figs. 31 and 32. While the peripheral distance from one die to the other may be varied in different machines, I have found that nine inches is very well suited for the usual conditions. It is thus possible with this disk to pass over two letters nine inches long without overlapping. For operating upon letters longer than nine inches it is necessary to bring only one letter into contact with the disk during one revolution, if it is desired to impress the stamp upon substantially the same surface portion of each letter. The principal part of the invention has to do with the provision of means for so controlling the motion of the pieces to be canceled to the disk that each letter will come into contact with the disk in substantially the same relationship to a canceling means and that slipping or shifting is practically excluded, whether a single piece or two pieces are acted upon by the disk during one revolution and with the provision of means for selectively controlling the rate of feeding motion to feed either one letter or two letters to the disk during one revolution thereof.

The letters or other pieces to be canceled are delivered upon the table constituted by the portion 1$^a$ of the platform 1. Lengthwise of the platform 1 extends a partition 5 against which the letters come to rest. For reasons which presently appear the letters are delivered in stacks upon a chute (not shown) so that the weight or rather a considerable part of the weight of the stack presses each letter as it reaches the foot of the stack firmly toward the partition 5.

On the far side of the partition are disposed friction rollers 6 and 7 projecting slightly through openings 8 and 9 respectively beyond the front face of the partition. The pressure exerted by a stack or a relatively large number of letters upon the lowermost letter produces a sufficient frictional contact between the rollers 6 and 7 and the letter so that normally, while the rollers revolve, each letter which comes in contact with the rollers is rapidly moved away from the stack toward the printing disk i. e. to the left in Figs. 1, 3 and 4. It should be noted at the very outset that normally only one letter can be moved at one time. The friction between the lowermost letter and the second letter is ordinarily distributed over the whole contact area and therefore not sufficient to cause movement of the second letter simultaneously with the first one. The following letters are still less affected by the action of the rollers 6 and 7.

However there are always certain irregularities and it has been found necessary or advisable in practice to provide mechanism operating to promote separation of two or more letters adhering to each other to a greater extent than is ordinarily or normally the case.

For this purpose I mount upon the table 1ª a separating frame 10 carrying a plurality of separating fingers 11, 12, 13, and 14, shown on a larger scale in Fig. 11. The fingers 11, 12 and 13 are pivotally mounted on the frame 10 and actuated by springs to resiliently bear upon a letter forced past them by the rollers 6 and 7. They are mounted substantially opposite roller 7 and are so spaced in vertical direction that the middle finger 12 bears directly against roller 7 while fingers 11 and 13 bear upon the letter above and below the roller, respectively. Taking into account that the roller 7 projects slightly beyond the face of the partition 5 and that the fingers 11 and 13 will force the letter above and below the roller 7 slightly inwardly toward the partition 5, the fingers 11, 12 and 13 are so dimensioned that the upper finger 11 will bear upon the letter in advance of finger 12 and finger 12 in advance of finger 13. The significance of this arrangement is as follows: Assume that a letter should be tilted upwardly at its rear end, the front end will meet first the upper finger 11 which offers a certain resistance to it. Since the lower front edge is still free to move, the force imparted to the letter will cause it to swing about the stop 11 as a pivot with the result that the rear end will move downwardly into contact with the table. Once the lower edge of the letter is in contact with the table, the impulse given to the letter by the roller 6 will cause it to overcome the spring action of the finger 11 and to pass under it. Normally the letter having entered between finger 11 and roller 7, the additional impulse given to it by roller 7 will cause it to rapidly pass toward the disk 4. Fingers 12 and 13 open in succession and by their spring pressure upon the letter bring the latter into firm frictional contact with roller 7. This contact is made particularly effective by the fact that fingers 11 and 13 bear upon the letter above and below the roller 7 and thus bend it against the edges of the roller.

The fingers 11, 12 and 13 have in fact a duel function. While they bear upon the letter, they exert pressure and create frictional contact with the roller 7. At the same time, however, they exert a restraining action upon any letter which should tend to pass along out of its normal order along with the lowermost letter. On the one hand the frictional contact with the first letter is comparatively small and on the other hand the resistance of the finger 11 against a second letter comparatively large so that a second letter is not likely to pass finger 11. However, should through some cause a second letter pass finger 11, the fingers 12 and 13 form successive barriers which by their additive action restrain the second letter sufficiently to at least retard its motion.

In addition finger 14 is provided which functions primarily as a separator. It preferably is a spring blade and has its front edge curved slightly rearwardly so as to more effectively intercept any letter which should pass forwardly out of its order. While I have found that this arrangement efficiently performs the function for which it is intended, I wish to emphasize that there is considerable latitude as to details. The important feature is the increasing additive action of a plurality of fingers successively acting upon a letter to restrain it and thereby retard it relatively to the lowermost letter. I have found that, unless two letters are adhesively connected as by glue or other substance, the arrangement does not fail to effectively separate them. The lowermost letter, on the other hand, has no difficulty in passing forward. To the contrary the fingers act upon it to increase the frictional contact and thereby the propelling impulses. The true character of the fingers thus is that they selectively act upon two or more letters to promote the motion of one and retard the motion of the other or others.

The frame 10 may be bolted to the table 1ª by means of a bolt 15 passing through an ear 16 on the frame 10.

The feeding means so far described have the sole purpose to successively feed the letters toward the disk, one by one, but in the absence of other special provisions the letters would reach the disk hap-hazardly i. e. in no particular positional relation to the canceling means thereon. It is therefore necessary to bring the movement of the letters into a definite constant time relationship with the movement of the disk so that a letter can come into contact with the disk only in a predetermined position relatively to a canceling means.

Generally and briefly expressed, the mechanism provided for this purpose is based upon the idea to temporarily arrest the movement of each piece until the disk has reached a certain poistion relatively to it and to release the piece as soon as this position is reached. However, in order to make any accidental slipping of the piece relatively to the feeding means and consequently relatively to the disk impossible after the piece is released, I provide means or construct and arrange said mechanism so that the piece is positively moved to the disk when it is released in the proper time relation to the disk.

I am aware that this idea can be carried out in various ways. For the sake of illustration I have shown two mechanisms accomplishing the particular purpose, one of said mechanisms being shown in Figs. 1, 3, 4 and 11–14.

Forwardly from roller 7 in the direction of movement toward the disk are mounted two rollers 17 and 18 projecting, like rollers 6 and 7, through openings in the partition slightly beyond the surface thereof. On the platform 1 is mounted by means of bolts 19 and 20 and a lug 21 a frame 22 similar to frame 10. At its inner end the frame carries two spring-pressed contact shoes 23 and 24 positioned to exert pressure against the rollers 17 and 18 respectively. While the detail arrangement is not very material and may be changed in various ways, I prefer to pivotally mount the shoes 23 and 24 in angular frames 25 shown distinctly in Fig. 17, 18 and 19. This frame 25 has lugs 26 forming at opposite ends bearings for a pintle 27 upon which the shoe 23 is pivotally mounted by means of lugs 28. On the pintle 27 is disposed a coil spring 29, one end of which bears against the upper surface of the shoe and the other end of which bears against the upstanding yoke-shaped portion 25$^a$ of the frame 25 so that the spring tends to force the shoe downwardly upon the rollers 17 and 18 respectively. To the shoe 23 is attached a strip of metal 30 which bears upon the rear surface of the yoke 25$^a$ and thus forms a stop limiting the downward movement of the shoe. The frame 25 is attached to the frame 22 by means of screws 31. Both shoes are alike and the description of one applies to the other. It is the function of shoes 23 and 24 to press the pieces to be canceled against the feed rollers 17 and 18 which, as is usual, have a peripheral surface of high frictional resistance, for instance rubber.

Between the shoes 23 and 24 is a mechanical element which has the most important function in the feed mechanism considered as a whole. Upon a block 32 is pivotally mounted a plate 33 similar to shoes 23 and 24. The block 32 has ears 34 forming bearings for a pintle 35 which in turn forms the pivot for the ears 36 on the plate 33 and carries a coil spring 37 which presses upon the plate in a downward or inward direction, the inward motion being limited by shoulders on the ears 36 abutting against the body of the block 32.

The pintle 35 extends at both ends beyond the ears 34 and forms a bearing for two arms 38 which are interconnected at their front ends by a bar 39 which is parallel to the front edge of the plate 33. The length of the arms 38 is such that the bar 39 can, during its inward pivotal movement, pass past the front edge of the plate 33. The arrangement is such that the free front edge 39$^a$ of the bar 39 extends transversely of the path of movement of the letters and forms a barrier or abutment substantially perpendicular to the plane of motion of the letters, when the arms 38 are in their innermost position which may be determined by any suitable stop mechanism.

On the block 32 is slidably mounted a U-shaped member 40. For the sake of mechanical simplicity I have made the block 32 of two parts, the inner part 32$^a$ being of smaller width than the outer portion thus defining recesses or slideways for the member 40 to slide in. The inner portion 32$^a$ may be screwed or otherwise fastened to the outer portion as by screw 41 and the block as a whole may be secured to frame 22 by means of screws 42.

At its front the member 40 carries a plate 43 pivotally connected upon a pintle 44 upon which is mounted a coil spring 45 one end of which bears upon the plate 43 and the other end against the block 32. The plate thus tends to move inwardly against a letter which passes by it, the inward movement, however being limited due to the position of the block upon the frame 22.

A spring 46 which is fastened to the block 32 passes inwardly between the ears 34 and bears against the spring 45 and pintle 44 and by its spring action tends to move the member 40 inwardly toward the letter.

Near its free ends the member 40 is provided with stop elements 47 and the arms 38 are provided with cam members 48 so shaped as to force the member 40 back against the tension of spring 46 when the arms 38 are swung inwardly toward the path of movement of the letters. On the other hand, when the abutment 39 moves out of the path of movement, the spring 46 will cause the member 40 to move toward the path of movement of the letters.

To the bar 39 is connected a spring blade 49. At present I have riveted or screwed the spring blade to an angle iron 50$^a$ and secured the angle iron to the bar 39. It is understood that for mass production the use of an angle iron would be made unnecessary.

The arrangement just described is such that the movement of the bar 39 toward the path of movement of the letters is limited by the action of the cams 48 upon the stop shoulders 47, the outward movement of the member 40 being limited by the pintle 44 extending across the block 32.

The outward movement of the barrier or abutment, away from the path of movement of the letters is normally prevented by an arm 50. This arm is periodically moved in the direction indicated by the arrow in Figs. 1 and 11 and returned to its normal position. The extent of angular movement is only relatively small and, it may be remarked at the same time, the time consumed by the oscillation very short, as will be more fully described.

The arm is secured to the upper end of a vertical shaft 51 to the lower end of which is secured an arm 52. The shaft 51 extends through a hollow stud 53 which is secured to the platform 1 by means of scews 54 or in any other suitable way. The shaft 51 is slidable in vertical direction and may be held in any one of two positions by means of a spring 55 having its hook-shaped free end extending through an opening 56 in the stud and engaging either one of two vertically spaced grooves in the shaft 51. By means of a knob 57 the shaft 51 may be lifted until the spring snaps into the lower groove or the shaft may be depressed to force the latch hook of the spring 55 out of the lower groove and then moved downwardly until the latch snaps into the upper groove.

Figure 5:
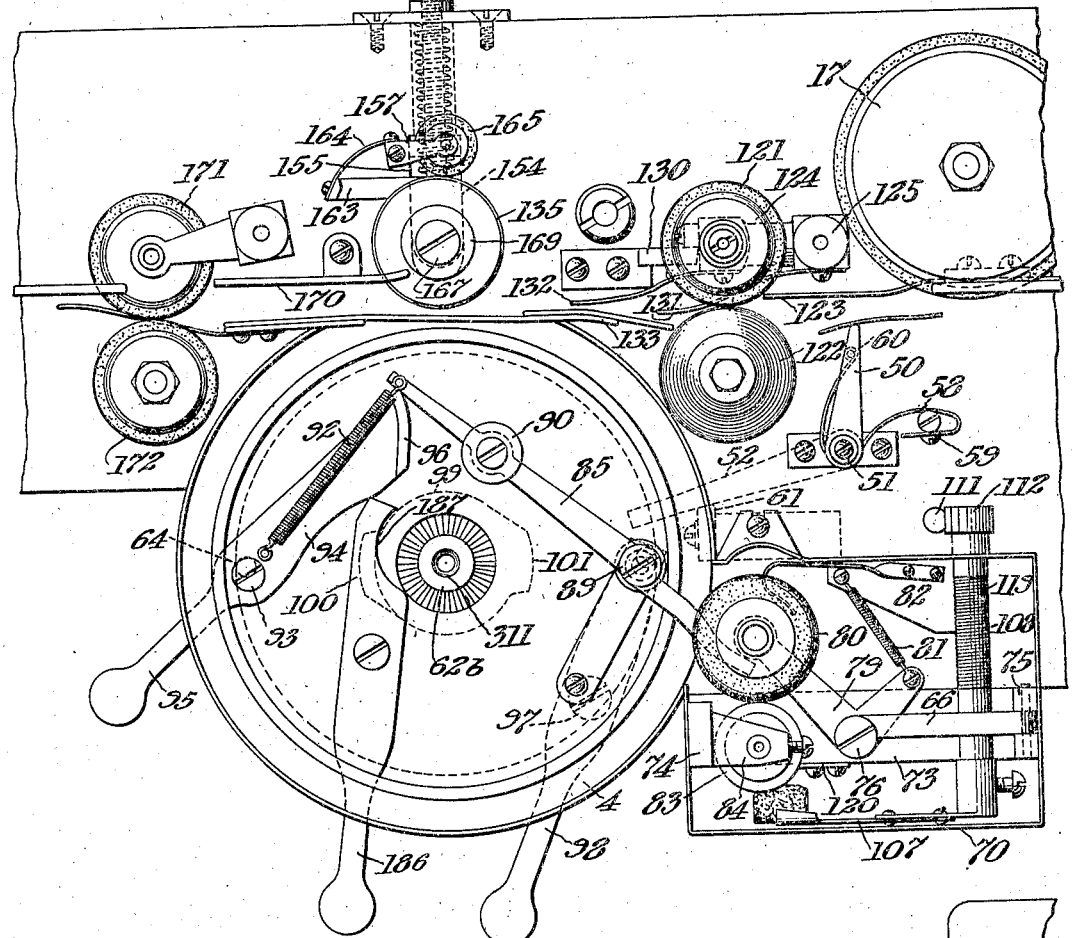
Fig. 5 is a fragmentary plan view of the machine, certain parts being omitted to clearly indicate the position of other parts.

A spring 58 is at one end secured to a post 59, passes around the shaft 51 to the forward end of the arm 50 and is held in potential position by means of a peg 60 shown in Fig. 5. The spring 58 is thus constantly under tension and when unrestrained will cause the arm 50 to bear against the spring blade 49 which in turn will resiliently hold the barrier 39ª in the path of movement of the letters. The angular movement of the shaft 51 in the direction of the force of spring 58 is limited by means of a stop 61 in the path of movement of arm 52. This stop 61 is preferably of rubber to eliminate the noise which would otherwise result.

Upon the shaft 62 by which the disk 4 is rotated is mounted an auxiliary disk 63 below platform 1.

This auxiliary disk carries at opposite points pins 64 and 65, one being longer than the other. The length or height of the pins is such that when the shaft 51 is pulled upwardly to its upper position, the arm 52 will clear the shorter pin 64 and be struck by the longer pin 65 only. When the shaft 51 is in its lower position, the arm 52 will be struck by both pins in turn. The arm 52 projects into the path of the pins 64 and 65 far enough to cause the desired angular movement of the shaft 51 and of the arm 50. Thus while the shaft 62 and the disk 4 make one revolution, the arm 50 may be oscillated once or twice at the will of the operator.

The operation of the mechanism thus far described is as follows:

The letters are first separated in the manner previously described and they are moved one by one toward the disk. But for the barrier 39 each letter would successively move along the path of motion defined by rollers 6, roller 7, rollers 17 and 18 and the pressure elements 11, 12, 13, 14, 23 and 24 and would then pass between rollers 121 and 122, which will be more fully referred to, to the disk.

Assume now that the shaft 51 is in upper position. The pressure on the barrier would therefore be released only once during one revolution. Assume further that the letters are 8 inches long, all letters being assorted according to size. While the barrier is in the position indicated in Figs. 1 and 11, the first letter will move against the barrier. This barrer forms a positive stop. The rollers are not able to force the letter ahead. They will merely slide over the surface of the letter. Just as soon, however, as the arm 50 is moved away from the spring blade 49, the frictional force of contact between the wheels and the letter can easily force the letter forward. The force of the impact imparted to the letter by the rollers will fling the barrier out of the path of movement and allow the letter to advance. Almost instantaneously after the letter has commenced its forward movement, the arm 50 will be released and snap back upon the side of the letter. Now, the barrier is ineffective and to the contrary the barrier 39 will be firmly pressed against the letter and thereby promote and increase the frictional contact of the letter with rollers 17 and 18 with the result that no slipping of the letter and no accidental retardation is likely. However, in order to preclude all possibilities of slipping the rollers 17 and 18 have a peripheral speed slightly in excess of the peripheral speed of the disk 4. Such excess speed does not result in a premature arrival of the letter at the disk, since the rollers 121 and 122 have the same peripheral speed as the disk and therefore do not allow the letter to advance relatively to the disk. The higher peripheral speed of the rollers 17 and 18 has been so chosen as to merely make a retardation impossible.

It is needless to say that the pin 65, the arms 50 and 52 and one of the canceling means are so correlated that the arcuate distance from the canceling means to the point at which the impression is made is the same as the distance from the barrier or abutment to the said point, at the moment the barrier is released. At any rate the relative positions may be so adjusted that the letter, after being released, will arrive in contact with the disk at the precise moment required to bring any predetermined portion of the latter into printing contact with the canceling means.

It is easily understood that in practice two envelopes of the assumed size can be canceled during one revolution of the disk and in fact it is the very purpose of the invention, as previously referred to, to obtain a machine of high working speed. In practice, for letters nine inches or less the shaft 51 is maintained in its lower position so that the arm 52 is struck by both pins 64 and 65 and the arm 50 oscillated twice during one revolution of the disk and the shaft 51 is lifted only for canceling letters larger than nine inches.

In the foregoing reference has been made to various elements tending to retard the movement of a second letter or other letters to thereby separate them and allow only one letter at a time to reach the abutment 39. In addition to these stop elements there is one other stop element which has a twofold stopping function, namely the plate 43 in conjunction with a small permanent abutment 43ª and a channel 43ᵇ in the partition wall 5. As shown in Fig. 11, the abutment 43ª is not abrupt but defines a short inclined plane and the front edge of the plate 43 is normally in substantially abutting relation with the free edge of the abutment. The front edge of a letter passing forwardly under the driving force of the rollers 6 and 7 will thus be slightly deflected and normally push the plate 43 out of its way. The spring 45 is comparatively weak and does not offer any appreciable resistance to the passing of the letter. Should a second letter prematurely and in spite of the restraining action of the preceding stop elements pass along with the first letter, it will also be deflected by the first letter and strike against the plate 43 nearer to the pivot point thereof and will be retained against further movement. This restraining action of the plate is effective for various reasons. In the first instance the tension of the spring increases the farther it is moved away from the abutment 43ª. In the second instance the front edge of the second letter has no wedging action but due to its deflection bears squarely upon the plate 43. Thirdly the second letter bears against plate 43 at points relatively close to its pivot whereby the lever action is comparatively short.

The second function of the plate 43 is as follows: At the beginning of the operation of the machine, it would be possible for the first letter fed into the machine, in the absence of the plate 43 and groove 43ᵇ or an equivalent arrangement, to pass by the abutment 39, during the short interval of release i. e. during the period of oscillation of arm 50, although the letter is not in the precise relation to the canceling means on the disk. It thus would be possible for the first letter to reach for instance a point near the location of channel 43ᵇ at the moment the abutment 39 is released and to pass by the abutment 39 an instant before the arm 50 snaps back. Under these conditions the letter would pass to the disk although it would be nearly an inch out of its proper place intended to be given to it by the abutment. It would be late in arriving at the disk and the canceling mark which is intended to be printed upon the postage stamp in the corner of the letter would miss the letter.

When the arm 50 is moved away from the spring blade 49, the spring 46 is free to act and it is strong enough to force the member 40 inwardly thereby moving the plate 43 inwardly into the groove 43ᵇ. The plate 43 is thus locked in the path of an oncoming letter while the abutment 39 is ineffective. A letter which would reach the abutment 39 too late and would pass by it out of its proper order, will be temporarily stopped by the plate 43. As soon as the arm 50 comes back against the abutment 39, the member 40 will have been pushed back by the cams 48 bearing upon stops 47 and the letter is free to move up against the abutment 39 where it will be held until the abutment 39 is released as previously described.

It may be mentioned that the plate 43, although it constitutes a useful contrivance in the operation of the machine, is by no means indispensable. It constitutes a refinement and operates to make the machine practically infallible in its action and precision.

The degree of precision without it is considerably higher than can be attained in other machines used or proposed at the present time.

It may also be stated here that the rollers 17 and 18 may have the same peripheral speed as the disk 4. The excess speed has been provided for merely as a matter of precaution to obtain an additional safety factor.

The inking mechanism has been constructed to establish a special correlationship with the periphery of the disk in order to carry out the various operations of which the disk is susceptible.

As previously mentioned the disk is provided with a plurality of distinct canceling means, two in the particular instance. According to whether only one of these canceling means is used during one revolution of the disk or both, the inking mechanism need ink only one or must ink both canceling means during one revolution.

It is also frequently the practice to apply cancelation marks along the whole length of the letters in order to effectively cancel stamps not placed in the corner or to effectively cancel all stamps of a row of four or five or even more sometimes met with. In that case it is necessary to apply ink to substantially the whole periphery of the disk, it being understood that the portions of the disk between the usual cancelation means above referred to may be and normally are provided with additional auxiliary canceling means such that the cancelation marks are in the form of advertising matter, as is well known.

The inking mechanism is therefore provided with means for selectively applying the ink to one or a plurality of distinctive canceling means, as desired, or to the whole periphery thereof.

Figure 6:
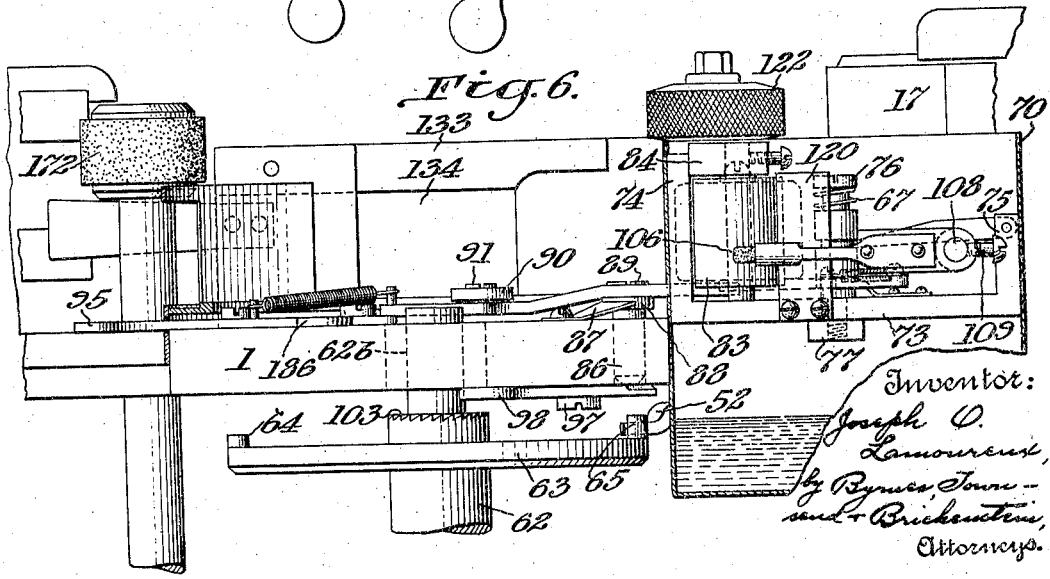
Fig. 6 is a side view of the construction shown in Fig. 5.

Having particular reference to Figs. 1, 5 and 6 the inking mechanism proper is contained in a casing 70 which may be suitably attached to the platform 1 as by means of bolts 71 and lugs 72, see Fig. 1. The casing 70 serves as a reservoir for the ink. In the casing is a cross piece 73 having upright portions 74 and 75. The cross piece 73 supports all the mechanism in the casing. Upon the piece 73 is adjustably mounted a stud 76 extending through a slightly oblong opening (not shown) in the piece 73 and screwed into a nut 77. Upon the stud 76 is mounted a bell crank lever 79 at the one end of which is pivotally mounted the ink transfer roller 80 and the other end of which is connected to a spring 81 which in turn is attached to a stationary support 82. Unless otherwise prevented the transfer roller will move in one direction under the action of spring 81. The arrangement is such that, unrestrained, the transfer roller will simultaneously contact with the periphery of the disk 4 and the inking roller 83. In that case the frictional contact with the disk will cause the transfer roller to rotate which in turn will cause rotary motion of the inking roller. The inking roller is mounted by means of journals in bearing in the cross piece 73 and a support 84 or may be pivotally supported in any other suitable way.

A lever arm 85 is pivotally mounted on a pin 86 which is mounted for vertical sliding movement through the platform 1. A spring 87 is secured at one end to the platform 1 and at its other to the pin 86 through a collar 88. The lever 85 is confined between this collar 88 and a head 89. It is understood that the detail may be changed in various ways.

The lever arm 85 carries intermediate one of its free ends and its pivot a roller 90 pivotally mounted upon a pin 91. The same free end of the lever 85 is attached to a tension spring 92 which exerts a pull upon the lever. The other free end of the lever 85 bears against the arm of the bell crank lever 79 upon which the transfer roller is pivotally mounted. Unless restrained, the spring 92 will pull the lever arm 85 inwardly and cause the disengagement of the transfer roller from the disk 4 and the inking roller 83.

Upon a pivot 93 on the platform 1 is mounted a lever 94 which has a handle portion 95 at one end and a cam surface 96 at its other end. The cam surface 96 is so formed that it will allow the lever arm 85 to slide inwardly when the arm is moved to the left or the handle portion 95 to the right and when thereafter the lever 94 is moved in opposite direction, the lever 85 is moved again outwardly. The spring 92 is shown as attached to the lever 94 near its pivot point.

Upon another pivot 97 upon the lower surface of the platform 1 is pivotally mounted a lever 98 the inner end of which is adapted to come into contact with pin 86. Pin 86 normally projects below the lower surface of platform 1. Either the pin 86 or the lever 98 or both are beveled as is shown, and by moving the lever 98 against the pin 86, the latter will rise against the tension of spring 87. It is thus possible to maintain the lever 85 in either one of two vertically different positions.

Upon the shaft 62$^a$ (see Fig. 32) carrying the disk 4 is mounted a collar 99 defining cams 100 and 101. For the sake of showing the relation of these cams to the lever 85, the collar 99 and the cams 100 and 101 have been shown in dotted lines in Fig. 5.

It should be remarked at this point that the shaft 62$^a$ has at its free end ratchet teeth 102 which engage similar ratchet teeth 103 upon shaft 62. The shaft 62 has an extension 62$^b$ fitting into a bore 62$^c$ of the shaft 62$^a$. This arrangement has been made to remove with facility the disk from its shaft 62.

The cam 100 has substantially twice the thickness of cam 101. Thus when the lever arm 85 is in its upper position as indicated in Fig. 6 and the lever 94 has been turned to allow lever arm 85 to move inwardly, both cams 100 and 101 will strike against the roller 90 and force the arm 85 outwardly during a definite time interval. As soon as each cam has passed, the arm 85 will again move inwardly. When the lever is in its lower position, only cam 100 will strike against the roller 90 and arm 85 will be forced outwardly only once during each revolution of the disk. When the lever 94 is moved to the position shown in Fig. 5, the arm 85 will be kept in its outer position. In the latter case the transfer roller 80 will be continuously in contact with the disk 4 and the inking roller 83 while in the other operations described the transfer roller 80 will be normally out of contact with the disk 4 and the inking roller and allowed to come into contact with them either once or twice during each revolution, according to whether cam 100 or both cams 100 and 101 are brought into contact with lever arm 85. The shape of the cams and their angular relationship to the disk and the other elements is such that the transfer roller will cover precisely such portion or portions of the periphery of the disk as is intended. In the particular instance the relation is such that only one or both of said distinctive canceling means 104, 104ᵃ and 105, 105ᵃ will receive ink according to the relative positions of roller 90 and cams 100 and 101 as previously pointed out.

The ink is applied to the inking roller 83 by means of an inking pad 106 carried at the end of a resilient arm 107 which is secured upon a shaft 108 as for instance by means of a set screw 109.

Upon the portion 75 is pivotally mounted an arm 66 engaging at its free end the bell crank lever 79. The shaft 108 has an eccentric portion bearing against the arm 66 so that the latter is raised and lowered during the rotation of shaft 108. The raising and lowering motion is transmitted to the bell crank lever 79 and the transfer roller 80, a spring 67 upon stud 76 acting upon the arm 66 to keep it in contact with the eccentric. The transfer roller thus continuously changes its position relatively to the disk and has a uniform wear.

The shaft 108 may be oscillated by any suitable mechanism. In the particular instance I employ a vertical pin 111 provided at its upper end with teeth 112 (see Figs. 9 and 10) engaging similar teeth upon a collar 110 carried at the end of pin 111. This pin 111 is guided for its vertical motion in a bushing 113 upon platform 2 and extending through the platform 2 rests upon an eccentric 114. The eccentric is rotated by means of a shaft 115 mounted in a bearing 116 bolted to the lower surface of the platform 2. The shaft 115 in turn carries a worm gear 117 engaging a worm 118. The pin is moved up by the eccentric and a spring 119 acting upon shaft 108 effects a positive downward movement of the pin 111. The movement of the pin is, of course, relatively slow as compared with the speed of the disk 4. At present I find that approximately 60 oscillations to four hundred revolutions of disk 4 gives very good satisfaction. Obviously this feature is a matter of mechanical detail to be changed or modified according to the results of experience.

The pad 106 periodically dips into the ink in the well which is the casing 70 and spreads it over the inking roller during the slow oscillation of the arm 107. A surplus is removed by the wiper 120.

There are various mechanical detail arrangements which, although they are not of prime importance, enter nevertheless into the operation of the machine to contribute in a certain measure to the success of the machine.

Between the abutment 39 and the printing disk 4 are disposed rollers 121 and 122. A spring blade 123 which is secured to the partition wall 5 forms a guide to direct the letters between the rollers 121 and 122. The rollers 122 are positively driven through suitable gearing to be referred to later on while the rollers 121 are pressed into contact with the rollers 122 by spring action. The rollers 121 are carried upon an arm 124 extending laterally from a vertical shaft 125 pivotally mounted upon the platform 1. The shaft 125 carries a crank arm 126 to which is attached one end of a tension spring 127, the other end of which is connected to a pin 128 on the platform 1. The spring 127 while sufficiently strong to firmly press rollers 121 against rollers 122, will readily yield to the wedging action of a letter. The arm 124 has a stop shoulder 129 adapted to bear against a stop element 130 rising from the platform 1. By use of this stop mechanism the arm 124 is prevented from moving beyond a definite limiting point and undue wear of the rollers 121 is avoided, these rollers having a peripheral surface of rubber.

The rollers 122 are preferably of metal and have a knurled surface to increase the gripping action. The peripheral speed of the rollers 121, 122 is the same as the peripheral speed of the disk. The peripheral speed of the rollers 17 is either the same or preferably greater than the peripheral speed of the rollers 121, 122, as previously mentioned. A letter coming from rollers 17 will thus readily pass between rollers 121 and 122. Spring guide blades 131 and 132 attached to the shaft 125 and the arm 124 respectively bear upon the letters passing out from between the rollers 121, 122 and press them into contact with a guide frame 133 having an opening 134 through which the printing disk 4 projects (see Figs. 5 and 6). The letters are thus forced toward the disk 4 and enter between the disk 4 and an impression roller 135 which presses the letter into firm printing contact with the disk 4.

In order to effect a dependable cancelation of the stamps and make them absolutely unfit for further use, I have provided special mechanism. To explain the significance of this feature it must be mentioned that fraudulent practices have been discovered, making the cancelation by ink alone ineffective. This practice involved the application of soap or other similarly acting material to the surface of the stamps prior to mailing the letter. The stamps thus prepared receive the cancelation mark, but the ink could be easily washed off and the stamp could be re-used.

I propose a simple and cheap device which may readily be incorporated in the machine thus far described by substituting for rollers 122 an attachment of special construction.

The shaft 136 which is driven from gear mechanism to be more fully described extends through platforms 2 and 1 and normally carries at its upper end the rollers 122. In the proposed modification shown in detail in Fig. 27, I use a sleeve 137 loosely mounted on shaft 136. The shaft 136 carries a gear 138 while the sleeve carries a gear 139. To the upper end of the shaft 136 is secured a roller 140 having preferably a rubber rim 140ª. To the upper end of the sleeve 137 is secured a roller 141 having a plurality of knife blade edges 142 around its periphery. Depending from the platform 1 is a stud 143 carrying two gears 144 and 145 loosely mounted thereon as one unit. The stud 143 is movably mounted toward and away from the shaft 136 through a slot 146 in platform 1 and may be secured in any adjusted position by means of a nut 147 screwing on the upper end of the stud and seated against the platform 1, as indicated in Fig. 4.

When the gears are in mesh, the gear 138 drives the gear 145 and with it the gear 144 which in turn drives the gear 139. As is apparent the diameters of the various gears are such that the sleeve and with it the roller 141 are driven at a speed which is considerably higher than the speed of the shaft 136 and roller 140. The roller 140 cooperates with the upper roller 121 to move the letter forwardly while the knife edges 142 due to the higher speed have a sliding movement relatively to the letter and thus exert a grinding or tearing action upon the stamp. The stop elements 129 and 130 limit the pressure of the rollers 121 so that the knife edges do not cut through the letter itself. The arrangement can be adjusted to produce any desired penetrating effect by the knife edges. In practice it is sufficient to effectively break through the film of soap that may be upon the stamp and thus allow the ink to penetrate into the fibrous tissues of the stamp.

Fig. 28 shows the roller 141 in plan view. The periphery of the knife edges may be suitably modified to intensify the tearing action. Thus, as shown in Fig. 29, the edges 148 may be finely serrated or as shown in Fig. 30, the edges 149 may be scalloped. In fact various other modifications may be resorted to to accentuate the tearing effect upon the stamp. It must be emphasized, however, that the adjustment is so made that no multilation of the stamp or the letter takes place other than the comparatively slight scraping of the stamp necessary for effective removal of the fatty coating.

The impression roller 135 may be adjusted toward and away from the disk 4. The shaft 150 upon which the roller 135 is mounted (see Fig. 4), is supported at its bottom in a bearing 151 having pivotal movement about a pin 152 held in a frame 153. Intermediate its ends the shaft 135 has a bearing 154 movably mounted in an oblong opening in platform 1. By means of a pin 156 this bearing 154 can be moved toward and away from the disk 4. A compression spring 157 tends to move the bearing and with it the shaft 150 toward the disk. By means of a nut 158 engaging the screw-threaded end of pin 152 the latter may be pulled outwardly against the tension of spring 157 and a jam nut 159 may be used to lock the nut 158 on the pin.

Motion may be imparted to the shaft 150 by means of a belt or rope from another shaft. In the particular instance I have keyed a grooved pulley 160 to the shaft 161 driving the rollers 17 and 18 and have keyed a similar pulley to shaft 150, a belt 162 interconnecting the two pulleys. The ratio of transmission is such that the peripheral speed of the impression roller is the same as that of the disk 4.

Upon a support 163 is mounted a spring blade 164 which carries at its free end a roller 165, the roller being mounted in a bearing frame 166 and serves the purpose to remove ink that may be carried from the disk to the impression roller.

The roller is connected to its shaft 150 by means of a friction drive including a plate 169 bearing upon the upper end of the roller 135, a head 167 at the upper end of the shaft 150 and spring 168 between the plate and the head. The frictional coupling is sufficient to normally constitute a direct drive connection, but readily yields under abnormal conditions and thus affords protection against unforseen contingencies incident to the high speed operation.

After the letters are printed or canceled by contact with the disk 4, they pass between guides 133 and 170 to friction rollers 171 and 172 which have the same peripheral speed as the disk 4. Roller 172 is driven from shaft 221 while roller 171 is held under tension against roller 172 in identically the same manner as roller 121 is held against roller 122, namely by means of a shaft 222, a crank pin 223, and a tension spring 224 attached to a pin 225. A spring 173 below the rollers directs the letters against the partition 5ª which is in alignment with the partition 5. A plurality of spring blades 174, 175 and 176 project outwardly at an angle to the partition 5ª and normally deviate the letters into a receptacle. It has been found, however, that these spring blades are more or less flattened out due to the impact caused by the high velocity. For this reason I have found it expeditious to mount cam fingers 177 upon a vertical shaft 178ª, said fingers periodically striking against the blades 174 and forcibly ejecting the letters laterally instead of allowing them to continue their original motion. It is not practical to stop the letters head-on, since that might mutilate them at the high velocity. For this reason the spring blades are used, which gradually reduce the force of the impact and yield to abnormal pressures. Once the force of the impact is broken, the letters are safely received in a receptacle.

However, to stop stray letters which in spite of these provisions would escape lateral deflections, a stop arm 178 is adjustably secured to the partition 5ª.

The spring blades 175 and 176 and the stop arm 178 are preferably attached to a plate 5ᵇ forming an extensible part of the partition 5ª. The part 5ᵇ may be adjusted by means of a screw-threaded stud 179 extending through a slot 180 in partition 5ª. A wing nut 181 may be released and screwed down when the desired adjustment has been made.

The casing 70 is provided with a cover 70ª. The mechanism between the platforms 1 and 2 is enclosed by a casing 182 which may be secured by means of screws 183 to an undercut portion 184 on platform 1.

The disk is surrounded by a casing 185 which has openings through which the levers 95, 98 and 186 extend. The lever 186, it should be mentioned, has at its inner end a circular portion 187 (see Fig. 5) adapted to fit into a circular groove 188 (see Fig. 32) on shaft 62ª. By moving the lever in one direction, the portion 187 will enter the groove and lock the disk 4 against vertical motion. When the lever is in the position indicated in Fig. 5, the disk 4 may be removed.

The power transmission mechanism may, of course assume different forms. The arrangement shown, however, affords a simple and compact machine.

Having particular reference to Figs. 2, 3, and 4, 200 is a pulley which may be connected by means of a belt to a motor. The power shaft 201 connected to the pulley is mounted in bearings 204 and carries intermediate its ends a bevel pinion 202 and the worm 118.

The worm meshes with the worm gear 117 previously described and shown in Figs. 9 and 10.

The pinion 202 engages the bevel gear 203 which is secured to the lower end of shaft 161. Keyed to shaft 161 or otherwise rigidly connected with gear 203 are gears 205 and 206. The gear 205 which is of large diameter is in mesh with gear 207 in driving connection with the shaft 136, previously referred to. The gear 206 is in mesh with gear 208 mounted on a short stub shaft 209 and gear 208 in turn is in mesh with the gear 210, keyed to shaft 211 on which roller 7 is mounted. Gear 210 is in mesh with gear 212 on stub shaft 213 and gear 212 is in mesh with gear 214 keyed to shaft 215 on which rollers 6 are mounted. The intermediate gears 208 and 212 are used merely to obtain the desired direction of rotation of gears 210 and 214.

Upon shaft 136 or otherwise rigidly connected with gear 207 is a gear 216 which is in mesh with a gear 217. Rigidly connected with gear 217 upon the stub shaft 218 is a gear 219 which is in mesh with gear 220 on shaft 62, previously referred to.

Gear 220 is in mesh with a gear 226 carried by stub shaft 227. Rigidly connected with gear 226 is a gear 228 which engages on the one hand a gear 229 driving shaft 221 and on the other hand gear 230 on a stub shaft 231. Gear 230 is in mesh with gear 232 driving shaft 178.

The operation of the machine as an entity is apparent from the description of the operation of the different mechanisms previously pointed out.

To briefly sum up the important phases of the operation, it is emphasized that the letters are placed in inclined stacks upon the table 1ª and are fed toward the disk 4. By means of the various stop devices the letters reach the abutment 39 one at a time and are held there until the rotating disk 4 reaches a predetermined point. When this point is reached, the arm 50 releases the abutment. The plate 33 has the important function to press against the letter and force it out of contact with the abutment. While the abutment is free to swing out of the way, the disengagement of the letter from the abutment might be impeded. The plate 33 thus has in substance an ejector action tending to free the letter from the abutment. This action is supplemented by the action of the spring 46 which moves the member 40 inwardly and bearing against the cams 48 forces the abutment 39 away from the letter.

When the arm 50 snaps back upon spring 49, the abutment is resiliently pressed against the letter and presses it into firm contact with the rollers 17 and 18 and thereby materially assists the shoes 23 and, as previously mentioned, this double pressure makes the movement of the letter to the disk absolutely positive or certain.

Reference is now had to Figs. 20–26, which show a modified form of mechanism for obtaining the increased or double pressure insuring a positive movement when the abutment is released.

The arrangement is generally similar to that previously disclosed. In place of the plate 22 and the mechanism carried thereby, is provided a plate 240 attached to the platform 1 in identically the same way as plate 22.

Near the front end of the plate 240 are pivotally supported holders 243 and 244 for the contact pieces 241 and 242 respectively. Springs 245 and 246 are attached at one end to the holders and bear at the other end against the plate 240 and thus tend to hold the pieces 243 and 244 in contact with rollers 17 and 18 respectively. The contact pieces 241 and 242 thus have substantially the same function as the contact shoes 23 previously described. In practice I prefer to mount the holders 243 and 244 upon separate strips 247 and 248. By means of slots 249 and 250 and screws 251 and 252 the plates may be made adjustable lengthwise of the plate 240 and by means of ears 253, 254 and screws 255 the strips 247 and 248 may be adjusted as desired to take up the wear upon the contact pieces. The strips may be held in proper position relatively to plate 240 by means of an undervent guide element 256 having sliding movement in a dove-tailed slot in the plate 240 and attached to the strips by means of a screw 257.

Upon the plate 240 is also secured a block 258 upon the front edge of which is pivotally supported an arm 259. The arm 259 has near its free end an opening 260 into which is adapted to project a transverse bar 261 carried by or forming a part of a spring arm 262 secured upon arm 259.

The arm 259 extends forwardly into proximity of the rollers 121 and 122. Adjacent the arm upon the platform 1 is pivotally mounted a cam element 263 upon a post 264. Upon shaft 51 is mounted in lieu of arm 50, an arm 265 having at its free end a pin 266 engaging a slot 267 in the cam element 263. Upon the post 264 is placed a coil spring 275 having one end bearing against a pin 268 on arm 265 and the other end bearing against a pin 269 or any other stationary part.

Normally the cam is thus made to bear against the spring arm 262 carrying the bar 261, which is in this case the abutment taking the place of the abutment 39, in the other form of mechanism. The bar 261 is therefore normally held in a position projecting through the opening 260 and forming an obstruction in the path of movement of each letter.

The cam 263 is periodically moved about post 264 against the tension of spring 268 and released. The spring arm 262 tends to move angularly away from arm 259 and to withdraw the bar 261 out of the opening 260. As soon, therefore, as the cam 263 is moved out of contact with the spring 262, the latter will spring outwardly and thus release the letter held by the bar 261.

At the same time the letter is specially pressed against the rollers 17 and 18 in order to avoid every possibility of slipping. The mechanism for accomplishing this may be as follows: Upon the block 258 are pivotally mounted arms 271 carrying rollers 270 adapted to bear against the rollers 17 and 18 respectively. To the arms 271 are connected and preferably integral therewith arms 272. Stops 276 are provided on block 258 to limit the movement of arms 272.

The cam element 263 carries a spring 273 which terminates at its free end in a cross bar 274. This cross bar 274 bears against the free ends of arms 272 when the cam element 263 is rotated to release the spring 262.

Figure 20:
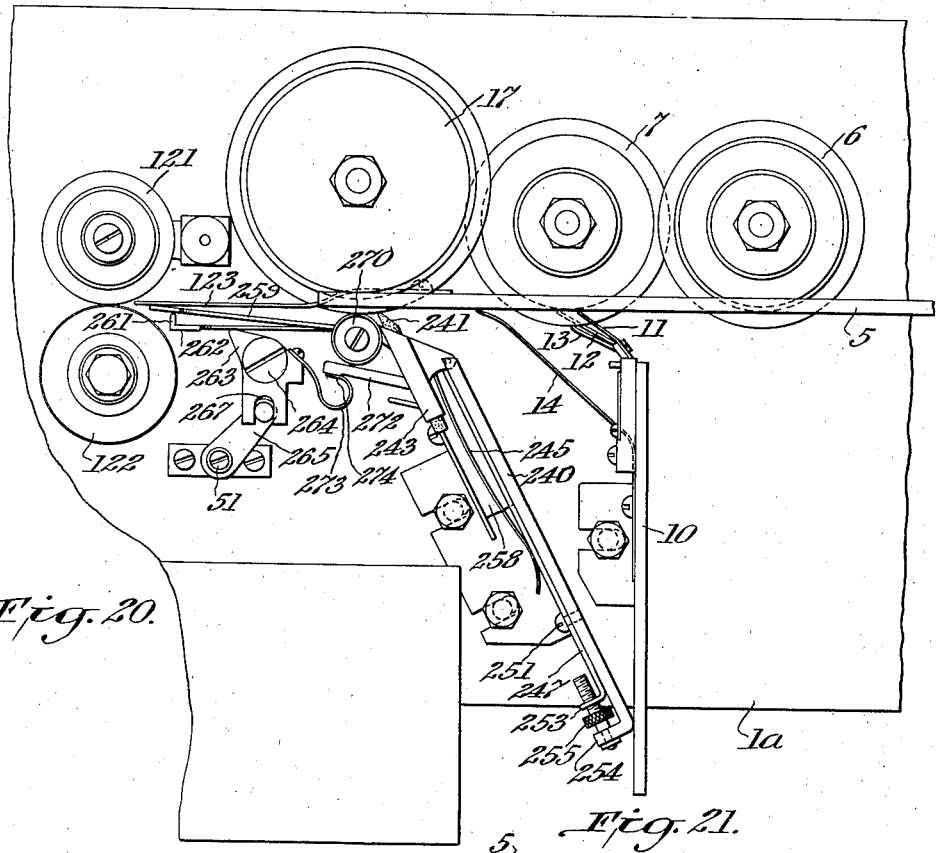
Fig. 20 is a plan view of a constructional detail forming a modification of the detail shown in Figs. 11–19.
Figure 21:
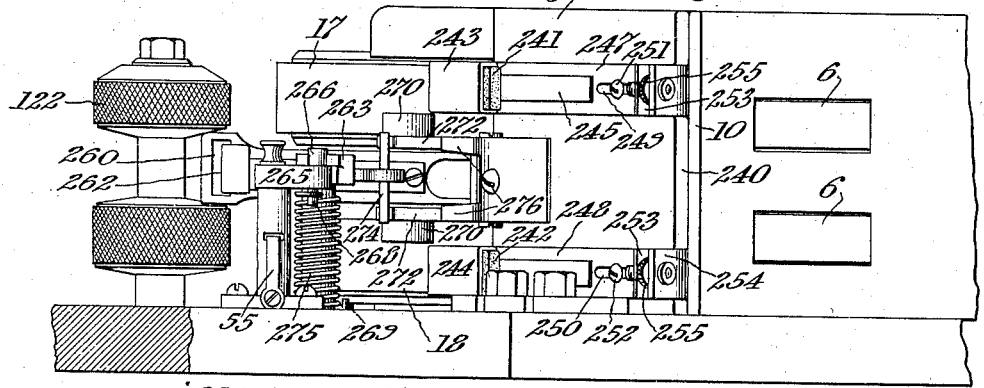
Fig. 21 is a side view of the construction shown in Fig. 20.
Figures 22, 23:
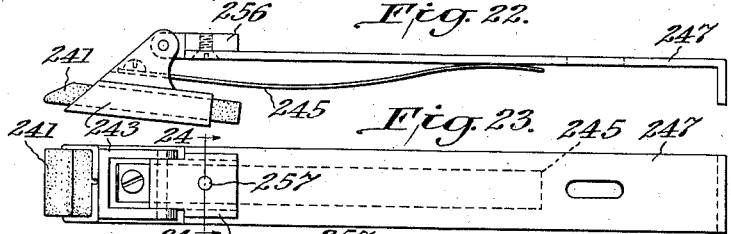
Fig. 22 is a plan view of a detail shown in Figs. 20 and 21.
Fig. 23 is a side view thereof.
Figure 24:
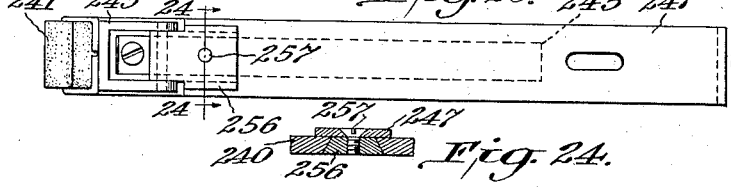
Fig. 24 is a section showing a detail relation of parts appearing in Figs. 22 and 23.

In Fig. 20, the cam element 263 is shown in the position when the spring 262 is released and the cross-arm 273 is pressing against the arms 272 forcing the rollers 270 against the rollers 17 and 18 and thus furnishing the extra or double pressure which makes slipping normally impossible.

When the bar or abutment 261 has moved out of the way, the letter is free to pass and is positively moved to the disk; as just described. When the cam 263 is released, i. e. when the pin 64 or 65 has released arm 52, the spring 275 will cause the cam to snap back against the spring 262.

The bar 260 will now bear against the letter without having any particular effect thereupon. It merely constitutes an abutment in position to restrain the next letter. As soon as the rear edge of the last letter passes the abutment, the latter closes in behind the edge of the letter and is ready to intercept the next letter.

As previously mentioned, the idea of temporarily interrupting the movement of each letter and then positively moving it to the disk when a predetermined relation has been established can be carried out in other ways. The correlation of means for applying a special pressure against the feed rollers at the moment the abutment or bar has been made ineffective and of the means for periodically making the abutment ineffective is obvious to the expert and may be attained by various means within the scope of the invention.

In the foregoing an attempt has been made merely to indicate in a general way the general principles governing the operation and some mechanical detail available for carrying out the invention.

The machine thus far described has to do primarily with the mechanism instrumental in bringing about precision of operation at high speed, as explained, in order to obtain a maximum working capacity. No account, however, has been taken of the fact that it is often necessary to interrupt the operation of a machine in order to change the type printing the hour, or the hour and date or even the hour, date and month at the same time.

At any rate the operation of changing the type is tedious and consumes in the aggregate a good deal of valuable time, whether the machine must be stopped for this particular purpose or whether the change is made before the machine is set into operation.

The mechanism shown in Figs. 33–39 serves the purpose to change the type by a simple motion and preferably during the operation of the machine.

The printing roller consists generally of a bottom part 300, a peripheral portion 301, a top or cover 302, changeable type and mechanism within the printing roller for automatically changing the type.

The canceling means 104 and 105 are composed of changeable type except as to the name of the postoffice. According to the general practice the type of the time is changed half-hourly. There are therefore 24 types necessary for each die for the twelve hour cycle. In addition to that it is necessary to change every 12 hours the type "A. M." to "P. M." and vice versa. In order to satisfy all conditions there must be thirty-one types for the days of the months and twelve types for the names of the months.

Having reference to Figs. 32 and 35, 303 represents the type for printing the year (1921), 304 the type for printing "P. M.", 305 one of the types for printing the hour (10 o'clock), 306 a type for printing the day of the month (24), 307 a type for printing the month (Nov.).

There are two sets of types 305 arranged in a complete circle, each set taking up half the periphery and containing 24 types. Below the types 305 is a similar circle containing two sets of types 306, each set containing 31 types. Below the types 306 is another circle containing two sets of types 307 each set containing 12 types.

Generally stated the mechanism includes means for successively bringing the types 305, 306 and 307 in their proper order within the dies 104 and 105 and to automatically change every 12 hours the types "A. M." and "P. M.". The type of the year must be changed by hand.

The type setting mechanism includes an arbre 308 passing centrally through the disk. At its upper end the arbre carries a knob 309 and at its lower end it forms a journal portion 310 fitting into the bore 311 in the shaft portion 62ᵇ (see Figs. 5 and 6), the bore 311 being slightly tapered in order to facilitate the entry of the journal portion 310.

A flat spiral spring 312 is anchored at its outer end in a cavity 313 of the bottom 300 while its inner end is connected to a pin 314 on the arbre 308. The arbre can be turned in one direction relatively to the disk and is returned to its original position by the spring 312.

The arbre carries two cams 315 and 316 on two different vertical planes. These cams are offset relatively to each other an angle of 180° and are operatively connected with two arms 317 and 318 respectively. The arms have at their ends rectangular frames 319 and 320 which encompass their respective cams. The cams are eccentrics having a circular portion 324. The eccentric portions 323 bear against the sides of the frames 319 and 320 and during a part of a revolution of the arbre move each arm from one extreme inward position to the extreme outward position and vice versa. As is clear from Fig. 34, the angular movement of arbre 308 necessary to move the arms 317 and 318 from one extreme position to the other corresponds to the angle defined by the center of the shaft and the points $a$ and $b$ in Fig. 34. Further angular movement of the arbre, while the circular portions 324 are in contact with the frames 319 and 320, does not effect any movement of the arms 317 and 318 but keeps them stationary during a time interval corresponding to the arc of the circular portion 324.

When the arms 317 and 318 are in their outward position, all the changeable types making up the dies 104 and 105 are in their operative position. When the arms are retracted, the types are in inoperative position. Before describing the detail arrangement and the various mechanisms, it may be stated that the type is changed while the arms are in retracted position.

The type must pass successively to the die 104 or 105. Each type is in turn attached to an arm while it is in retracted position and then moved outwardly out of the circular row of type. Before the next type can be used, the one in use must be carried back into its proper place in the row and then the whole row must be moved to bring the next type in alignment with the arm to take the place of the preceding type. The arrangement as will be described, is such that each type is firmly interlocked with the arm while it is in printing position.

The three sets of types 305, 306 and 307 are supported upon ring plates 325, 326 and 327 respectively, each ring plate having partitions 325ᵃ, 326ᵃ and 327ᵃ, respectively. Each type has near its rear end a transverse channel 328 and the thickness of the adjacent end portion is slightly reduced to define a substantial clearness 329.

Connected with the arm (317, 318) are a plurality of connectors 330, 331, 332 having their lower faces cut away to slide over the ring plates 325, 326 and 327 respectively. At their forward ends these connectors have tongue and groove elements fitting into the channels 328 and the clearances 329 respectively.

The connectors are separately connected to the arms (317, 318) by means of dowel pins 333 and 334.

When the arms are retracted, the tongue and groove elements referred to are in circular alignment with the channels 328 and clearances 329 of the types and when a ring plate together with its types is moved, the type moving toward one of the connectors will take the place of the preceding type. When the new type is in position, the arms are moved again outwardly to bring the types into printing position.

The type 303 for printing the year is secured to the arm (317, 318) by means of screws 335. The types "A. M." and "P. M." are carried upon a frame 336 pivotally connected to the type 303.

The mechanism for successively changing the type is as follows:

Upon the arbre 308 is mounted a disk-shaped element 337 which carries a stop shoulder 338 adapted to bear against a stop element 339 mounted upon a post 340. The element 337 also has a cam shoulder 341 adapted to bear against a toe 342 at one end of a lever 343 pivoted on stud 344. The lever 343 is held under tension in one direction by means of a coil spring 345. On the other end of lever 343 is pivotally mounted a tooth 346 adapted to engage notches 347 in the ring plate 325.

When the cam shoulder 341 is moved against the toe 342, the lever 343 is caused to move about its pivot post 344 and the ring plate 325 with the types 305 is moved correspondingly.

In Fig. 33 the whole mechanism is in what may be called its normal position. The stop shoulder 338 is up against the stop 339. The arms 317, 318 are in the position shown in Fig. 34. During the movement of the disk-shaped element 337 from the position shown in Fig. 33 to the position shown in Fig. 39, i. e. until the cam shoulder 341 comes into contact with the toe 342, the cams 315 and 316 have moved correspondingly and have come into the positions shown in Fig. 39 and the arms 317, 318 have reached their innermost position. Thereby the types 305 which have been in use have been brought back into circular alignment with the row of types 305.

Upon further movement of the element 337 the lever 343 is turned about its pivot and the ring-plate 325 is advanced one step equal to $7\frac{1}{2}°$, which corresponds to 1/48 of the periphery. The precise movement required is determined by a stop 348 against which the tooth 346 comes to rest. When the knob 309 is released, the spring 312 returns the arbre 308 and the element 337 to their original position. The cams 315 and 316 push the arms 317, 318 outwardly and the new type 305 together with the other types, which are normally the same as before assume the printing position. The types are positively held against inward movement since there is no play between the arms 315, 316 and their frames 319, 320 as is clear from Fig. 34.

While the disk element returns to its normal position, the spring 345 draws the lever 343 back to its normal position shown in Fig. 39. A spring 349 on lever 343 bears against a pin 350 on tooth 346 and causes it to slide back about its pivot and at the end of its movement comes to rest directly in the next notch 347, there being of course as many notches as types.

Upon a pivot 352 is mounted a ratchet wheel 353 having forty-eight ratchet teeth. Upon the pivot 352 is also mounted a lever 354 having a cam face 355 which bears against a pin 351 on lever 343. On the lower surface of lever 354 is pivotally mounted a pawl 356 pressed into engagement with the ratchet teeth by means of a spring 357 attached to lever 354. The lever 354 in turn is held in contact with the pin 351 by means of a spring 358.

When the lever 343 is turned about its pivot by means of the cam shoulder 341, the lever 354 will follow the pin 351 and the pawl 356 will slide over one tooth and engage behind. In other words the pawl will advance an angular distance corresponding to one tooth on the ratchet wheel 353. When the lever 343 returns, the pin 351 will move the lever 354 about its pivot and thereby turn the ratchet wheel an angle corresponding to one tooth.

It is thus clear that the ratchet wheel 353 will make one complete revolution when the lever 343 has been acted upon 48 times. It is also evident that the lever 343 must be acted upon forty-eight times to advance the time exactly one day, for instance from 12 at night to the same time the night following.

Provisions are therefore made to automatically advance the types printing the days of the month every time the ratchet wheel makes one revolution.

Upon a pivot 359 is pivotally mounted a lever 360 which carries near its end a pivoted tooth 361 engaging one of the notches 362 in the ring-plate 326. The lever 360 carries a cross-piece 364 which is a link in the lever system 363 364 365 366. The cam lever 363 is drawn outwardly by a tension spring 367 and is normally held against the circular pivot end of lever 354. The lever 363 has a lug 368 which spaces it from the ratchet wheel 353 and forms a bearing point for a spring 369 anchored at its end to a pin 370 on the ratchet wheel. When during one complete revolution of the ratchet wheel 353 the free end of the spring 369 comes in contact with the lug 368 it forces the lever 363 inwardly until its pointed end comes to bear against the curved shoulder 371 on a cam plate 372 secured upon the upper surface of lever 343. When now lever 343 is moved the next time, the shoulder 371 will force the lever 363 endwise thereby causing the tooth 361 to move the ringplate 326 forwardly one step. At the same time the movement is transmitted through lever 365 to lever 366 which carries a pawl 373 engaging a ratchet wheel 374 and the ratchet wheel 374 is also moved one step ahead. It must be borne in mind that the angular movement of the lever 343 corresponds to 1/48 of the periphery while the angular movement of the lever 360 corresponds to only 1/62 of a complete angle of 360°. Provisions must therefore be made to allow the lever 343 and the tooth 346 to move their required angular distance while the lever 360 and the tooth 361 etc. move through a smaller angle.

This may be accomplished in various ways, In the particular case by means of the curved cam shoulder 371. During the initial angular movement of lever 343 the pointed end of lever 363 slips over the curved cam surface until it finally engages in the notch 376. Upon further movement of the lever 343 the lever 363 is now moved lengthwise. The notch 376 is so positioned that the continued movement of lever 343 to its limit will cause the tooth 361 to move the ringplate to move to its final position i. e. until the tooth abuts against stop 377. As soon as the lever 343 springs back, the lever 363 will snap back into its original position. At the same time the levers 360 and 366 will be drawn back by means of spring 380 to their former positions shown in Fig. 39, the spring 380 being connected to levers 360 and 366. The spring 378 acts upon pin 379 and causes the tooth 361 to enter the next notch 362 ready for the next movement.

The ratchet wheel 374 has 31 ratchet teeth. After the lever 363 has been acted upon 31 times in the manner described and the ringplate 326 has made one half revolution, the ratchet wheel 374 will have made one complete revolution. Upon ratchet wheel 374 is placed a pin 381 which once during each revolution of the ratchet wheel 374 comes to bear against a lever 382. The lever 382 has a tooth 384 adapted to engage a notch 385 in the circumference of the disk element 337. Adjacent the lever 382 is a pin 386 upon which is mounted a cam lever 383 which has a front portion 383ᵃ bearing against the front edge of lever 382 but cut away at its lower edge to allow the pin 381 to pass underneath. In Fig. 39 the pin 381 has just come in touch with the cam lever 383 and has forced it slightly inwardly. The front edge of the portion 383ᵃ at the same time has pressed against the lever 382 and has forced it inwardly sufficiently far, so that the tooth 384 comes into the path of movement of the periphery of the disk element 337. When the arbre is now turned again, the tooth 384 will be received in the notch 385 and upon continued movement the lever 382 will be moved lengthwise. Upon a pivot stud 386ᵃ is mounted a lever 387 one end of which is pivotally connected to the lever 382 and the other end to a tooth 388. When the lever 382 is moved endwise, the lever 387 is turned about its pivot 386ᵃ and in turn causes the tooth 388 to move the ringplate 327 ahead one step. At the same time that the arbre 308 and the disk element 337 and the levers 382 and 387 are moved, also the ratchet wheel 374 is moved one step ahead and the pin 381 passes the front edge of the cam lever 383. When the disk element 337 has thus moved the ring plate 327 ahead by the instrumentalities described, the pin 381 is free to pass underneath the portion 383ᵃ and the lever 382 is free to return to its original position under the influence of spring 389 which is connected to the levers 382 and 387. The lever 387 in turn is retracted by means of a spring 390. The tooth 388 is likewise drawn back by means of a spring 391 and comes to rest in the next notch 392.

The portion 383ᵃ has been provided to obtain a great leverage for moving the lever 382 and thus reduce the force necessary for moving it. The stud 386 projects upwardly from the lever 383 and forms a stop limiting the outward movement of lever 382. The stop 393 determines the precise angular movement of tooth 388 during the advance of ring plate 327.

The return movement of levers 343, 360 and 387 is precisely determined by stop pins 394, 395 and 396 respectively.

It is thus clear that every time the arbre is turned to its operative limit, a new type is placed into the die changing the time by half-hour steps.

At the end of a cycle of forty-eight half hour changes, the date is automatically changed. At the end of a cycle of thirty-one changes of the date the month is automatically changed.

It should also be noted that after the lever 366 has moved the ratchet wheel 374 one step, it will be returned and during such return movement the pawl 373 slides back over one ratchet tooth and snapping in behind it, it is ready for the next movement. The pawl 373 is pressed against the teeth by a spring 397. A spring pawl 398 prevents return movement of ratchet wheel 374 just as a spring pawl 399 prevents return motion of ratchet wheel 353.

Upon the types 305 for printing "12" denoting 12 o'clock are projections 400 and 401. Upon the lower surface of each of the frames 336 are projections 402 and 403. As previously stated, the frames 336 are pivotally supported from the type 303 as by means of a screw 404. The frame 336 is limited to a definite angular movement by means of stops 405 and 406.

In Fig. 33 the arms 317, 318 are in their outward position and the types in the die in printing position. In Fig. 39, however, the arms 317, 318 are retracted. When now the ring plate 325 carrying the types 305 is advanced from the position shown in Fig. 33 while the arms 317, 318 are in the position shown in Fig. 39, the projection 400 will strike against the projection 402 on the frame 336 adjacent to it while the projection 401 will strike against the projection 403 on the other frame 336. The upper frame 336 (Fig. 39) will thus be turned to bring the other type into printing position. The lower frame 336 will likewise be turned to bring the other type into printing position.

After another 12 hour cycle i. e. after half a revolution of the ring plate 325 the projection 400 will come into contact with the projection 403 on the lower frame 336 while the projection 401 will come into contact with the projection 402 on the upper frame 336, both operating to return the frames to their prior positions and again changing the type from "A. M." to "P. M." or vice versa. Thus the types 304 are automatically changed every twelve hours. The change takes place while the arms 317, 318 are in retracted position. After the change the types are returned to printing position together with the other movable types.

A friction spring 407 is placed between the frame 336 and the arm immediately above it to frictionally hold the frame 336 in place.

Upon the upper surface of the frames 336 are also two pins 408 and 409 with the function to properly adjust the types 304 in printing position. The lower surface of the arm carrying the type 303 is cut away to provide a clearance 410 of sufficient depth to allow the pins 408 and 409 to pass. As indicated in Fig. 39, the pin 408 comes directly under the type 303, the latter being broken away to show the position of pin 408. Similarly, when the type 304, has been changed, the pin 409 comes below the type 303. However, in the position shown in Fig. 39, the pin 409 comes in contact with the rim 301 of the disk while on the other side the projection 406 is in contact with the rim. Should the frame 336 be accidentally displaced, it will be readjusted when the arms 317, 318 move into their outer position, as is obvious. When the frame 336 is turned to bring the other type into operative position, as described, the pin 408 and the projection 405 will come against the rim with the same effect.

The ring plates 325, 236 and 327 may be held against backward motion by means of spring pressed pawls pivoted in the body of the disk and bearing against the inner edges of the types 305, 306 and 307 respectively.

In Figs. 38 and 39 are indicated two pawls 411 and 412 mounted upon pins 413 and 414 and acted upon by spring arms 415 and 416 respectively of a spring 417. It should be noted that the ring plates 325 and 327 turn in one direction while the ring plate 326 turns in the opposite direction. The spring-pressed pawls exert a braking action preventing backward movement of the ring plates 325, 326 and 327 while the arms 317, 318 are in retracted position. It must be kept in mind that during the turning movement of the arbre 308 there is a period in which the arms 317, 318 are stationary while the various translating mechanism operate upon ring plate 325 to advance it while in 47 times out of 48 times the ring plate 326 must remain stationary. It would be possible due to frictional contact between ring plate 325 and the types 306 immediately below for the ring plate 326 to move simultaneously with the ring plate 325. The brake mechanism just described prevents such undesired motion. In fact these brakes prevent all undesired movement of any ring plate whatever its cause might be, while the arms 317, 318 are in their innermost position, but the frictional action is not sufficient to interfere with the positive movement imparted to the ring plates by means of the mechanism described.

The ring plate 327 may be held against accidental movement by similar means or by any other suitable means as for instance by the action of a spring wire (not shown) held under tension against the types 307.

In order to make it possible to hold the movable types out of their printing position, one of the arms 317, 318 has an undercut notch 418 and adjacent the arm is pivotally mounted a pin 419 carrying a ratchet tooth 420. A spring 421 is secured to a portion 422 above the tooth and has a sliding fit in a slot in a pin 423. The pin 419 extends through the cover 302 and carries at its end a finger 426. When the arms 317, 318 are in retracted position, the finger 426 may be turned to cause the tooth 420 to engage in notch 418. The spring 421 slides in the slot in pin 423 and by its binding action in the slot tends to hold the tooth in engagement. At the same time the spring action of spring 312 tends to move the arms outwardly and thus holds the tooth in the undercut notch 418.

The cover 302 is secured upon the disk by means of screws 424 extending into holes 425 in the body of the disk.

The collateral dies 104ᵃ and 105ᵃ are detachable to make it possible to substitute other forms of dies, as may be desired.

The particular dies 104ᵃ, 105ᵃ, carry the type "D" which means "Dropped". Another die may contain the letter "C", meaning "Collected". Various other forms may be kept on hand for special cancelation marks. The other remaining part of the periphery of the disk may also be made detachable in parts or as a whole for similar purposes.

In practice it is not necessary to turn the arbre. When the machine is in motion, it is merely necessary to hold the knob 309 until it slips in the hand. The relative motion between the elements operated by the arbre is of course the same whether the arbre is held and the disk moves, or whether the disk is stationary and the arbre moves. When the knob slips in the hand, the knob is released and the time has been advanced 30 minutes. In order to set the type a plurality of steps, it is merely necessary to repeat the holding operation as many times as is necessary. When it should be necessary to repeat a large number of times, it would be a matter of expediency to take prints from the die to indicate the approach of the desired setting without going to the trouble of counting the operations.

The setting operation is a matter of skill which is easily acquired.

The operation of the type setting mechanism is obvious from the above description. It is needless to point out the great advantages resulting from it. It is not only possible to set the type in the shortest possible time, but it avoids the necessity of having on hand a large number of loose types which may become lost. The most important advantage, however, is that it is possible by a simple and short movement of the hand to reset the type while the machine remains in operation. This advantage is more conspicuous to and appreciated by the postal authorities which are more familiar with the actual practical conditions. Time is more of an element in the dispatch of mail than in most other functions of the daily life.

In addition a brief résumé may be of the more important features of the machine as a whole.

In the first instance the printing disk which is necessarily relatively heavy and has a relatively high speed has a continuous motion. It is not stopped and started for each impression. The importance which this feature has in regard to the design and construction of the machine is obvious. Instead only each letter is stopped and released. It is possible to obtain a machine of much greater working speed by continuously revolving the printing disk and periodically stopping the letters.

In the second instance, the machine described or other machines constructed within the scope of the invention is susceptible, by the manipulation of simple mechanism, of various modes of operation. By the shifting of a simple lever, the machine can be changed from an intermittent printing operation to continuous printing operation. Again, the intermittent printing operation can be set by the shifting of a simple lever, to cancel during one revolution of the disk either one letter or two letters or, so far as the scope of the invention is concerned a plurality of letters greater than two. The working speed of the machine can thus be increased in ratios of 2:1 etc. according to the size of the assorted letters. This ready flexibility or adaptability is of great advantage in the practical field of application, as is obvious.

In addition the mechanisms of the machine are so constructed and correlated that by simple changes attachments can be embodied which positively counteract any and all attempts to prevent the effective cancelation of the stamps and make their reuse possible.

Furthermore, the ease of adjustment of the inking mechanism in co-ordination with the different printing operations is a material and important advantge.

Also the precision of the feeding and separating system due to the co-operative relation of a plurality of separate elements acting at different times and at different points in the path of travel of the letters to the disk contributes in a great measure to the success of the machine as a whole.

The importance of the type-setting mechanism as a time-saver has been explained. While this mechanism, as such, covers a separate and distinct phase, it is nevertheless inherently an essential and indispensable part of the machine as an operative unit within the scope of the invention, the real and distinct aim of the invention being the highest possible working speed concurrently with the highest possible degree of precision of operation, in other words the highest possible rate of effective cancelation.

In conclusion it may be emphasized that the machine and mechanism described represents the result of a purely experimental stage and that in actual conditions of commercial manufactures many details may and will be changed in accordance with standard workshop practice. The specific disclosure made must therefore be considered primarily in the light of the broader idea of means rather than in its narrower aspect.

In the specification and in the claims the term "means for positively moving" is used in a special sense and should be understood in that sense. While the feeding or driving means are not positive driving means as ordinarily understood, they operate nevertheless to prevent slipping of the letters relative to the disk.

I claim—

1. In a stamp-canceling machine, a circular printing disk having on its periphery a plurality of angularly spaced canceling means, means for continuously rotating the disk, means for moving pieces to be canceled to the disk and mechanism operatively connected with the disk and operable at will to bring during one revolution of the disk one piece into contact with one of the said canceling means or a plurality of pieces successively into contact with successive canceling means thereon.

2. In a stamp-canceling machine, a circular printing disk having on its periphery a plurality of angularly spaced canceling means, means for continuously rotating the disk, means for moving pieces to be canceled to the disk and mechanism operatively connected with the disk and operable at will to bring during one revolution of the disk one piece into contact with one of the said canceling means or a plurality of pieces successively into contact with successive canceling means thereon, said mechanism including means for bringing each piece into contact with the disk in substantially the same relation to a canceling means.

3. In a stamp-canceling machine, a circular printing disk, means for continuously rotating the disk, inking mechanism, means for controlling the inking mechanism at will to ink either one distinct angular portion or a plurality of distinct angular portions or the whole periphery of the disk during one revolution and means for controlling the rate of feeding the pieces to be canceled to the printing disk.

4. In a stamp-canceling machine, a circular printing disk having a plurality of angularly spaced distinctive canceling means, means for continuously rotating the disk, means for moving pieces to be canceled to the disk, mechanism operatively connected with the disk and operable at will to bring during one revolution of the disk one piece into contact with one of the said canceling means or a plurality of pieces successively into contact with successive canceling means thereon, inking mechanism and means for controlling the inking mechanism at will to ink either one of the distinctive canceling means or all of said canceling means or the whole periphery of the disk.

5. In a stamp-canceling machine, a circular printing disk, means for continuously rotating the disk, an inking roller, an ink-transfer roller, means for rotating the inking roller, mechanism normally operative to maintain the transfer roller out of contact with the inking roller and the disk, means connected with the disk for automatically operating said mechanism to periodically bring the transfer roller into contact with the inking roller and the disk and means for controlling the rate of feeding the pieces to be canceled to the printing disk.

6. In a stamp-canceling machine, a circular printing disk, means for continuously rotating the disk, an inking roller, an ink-transfer roller, mechanism normally operative to maintain the transfer roller out of contact with the inking roller and the disk, means connected with the disk for automatically operating said mechanism to periodically bring the transfer roller into contact with the inking roller and the disk, means operable at will to bring the transfer roller permanently into contact with the inking roller and the disk and means for controlling the rate of feeding the pieces to be canceled to the printing disk.

7. In a stamp-canceling machine, the combination with a printing disk and means for feeding letters to the disk, of mechanism in the path of the letters to the disk operative to scrape the surface of the stamps on the letters and thereby remove coatings on the stamp tending to make the printing ineffective.

8. In a stamp-canceling machine, the combination with a printing disk and means for feeding letters to the disk, of mechanism in the path of the letters to the disk operative to scrape the surface of the stamps on the letters and thereby remove coatings on the stamps tending to make the printing ineffective, said mechanism including a pressure roller on one side of said path having a predetermined peripheral speed, a second roller, on the opposite side of the path, having scraping means on its peripheral surface and means for imparting to the second roller a peripheral speed in excess of that of the first roller.

9. In a stamp-canceling machine, the combination of a printing disk, means for continuously rotating the disk, means operative to feed letters to the disk one by one in a constant predetermined relationship to the disk and means immediately in advance of the disk for scraping the surfaces of the stamps and thereby removing coatings on the stamps tending to make the printing ineffective.

10. In a stamp-canceling machine, a printing disk, means for rotating the disk, a plurality of types contained in the disk and means operable at will during the operation of the disk for successively bringing the different types into printing position.

11. In a stamp-canceling machine, a printing disk, means for rotating the disk, a plurality of groups of different types contained in the disk and means operable at will during the operation of the disk for successively bringing different types of the same group and types of different groups into printing position at the periphery of the disk in a predetermined order.

12. In a stamp-canceling machine, a printing disk, means for rotating the disk, a composite printing die on the periphery of the disk including a plurality of types of different character and mechanism for automatically altering the die, said mechanism comprising a plurality of groups of types corresponding to the different types in the die and means operable at will during the operation of the disk for successively bringing the different types of the same group and types of different groups into printing position in the die in a predetermined order.

13. In a stamp-canceling machine, a printing disk, means for rotating the disk, a composite printing die on the periphery of the disk including a plurality of axially spaced types of different character, a plurality of axially spaced circular rows of types in the disk each including one of the types in the die and means operable at will during the operation of the disk for changing types in the die.

14. In a stamp-canceling machine, a printing disk, means for rotating the disk, a composite printing die on the periphery of the disk including a plurality of types of different character and means operable at will during the operation of the disk for changing the said types.

15. In a stamp-canceling machine, a printing disk, means for rotating the disk, types in the disk for printing hours of the day, types in the disk for printing the days of a month, types in the disk for printing the months and means in the disk operable at will during the operation of the disk for bringing any one of the types of each group into printing condition on the periphery of the disk.

16. In a stamp-canceling machine a printing disk means for rotating the disk, a circular row of types for printing the hours of the day, a circular row of types for printing the days of a month, a circular row of types for printing the months, said rows being arranged within the disk, in axially spaced relation, an opening in the periphery of the disk, means for moving each row of types past said opening, means for moving one type of each row through said opening into printing position in the periphery of the disk and means operable at will during the operation of the disk and connected with said means for successively bringing the said types into printing position in a predetermined order.

17. In a stamp-canceling machine, a printing disk, means for rotating the disk, a circular row of types including a plurality of sets of types for printing the hours of the day, a circular row of types including a similar plurality of sets of types for printing the days of a month, a circular row of types including a similar plurality of sets of types for printing the months, a similar plurality of uniformly spaced openings in the periphery of the disk, means for moving each row of types past said openings, means for moving one type of each row through each opening into printing position in the periphery of the disk and mechanism for operating said means for successively bringing the said types into printing position in a predetermined order so that at the same time like types are in printing position in each opening.

18. In a stamp-canceling machine, a printing disk, means for rotating the disk, a circular row of types including a plurality of sets of types for printing the hours of the day, a circular row of types including a similar plurality of sets of types for printing the days of a month, a circular row of types including a similar plurality of sets of types for printing the months, a similar plurality of uniformly spaced openings in the periphery of the disk, means for moving each row of types past said openings, means for moving one type of each row through each opening into printing position in the periphery of the disk and mechanism operable at will during the rotation of the disk for actuating said means to successively bring the said types into printing position in a predetermined order so that at the same time like types are in printing position in each opening.

19. In a stamp-canceling machine, a printing disk, an opening in the periphery of the disk, a set of types for printing the hours, two types for printing "A. M." and "P. M." respectively, means for rotating the disk, and means operable during the rotation of the disk for successively bringing the hour-types into printing position in the said opening together with one of said two types and then bringing the hour-types again into printing position together with the other one of said two types.

20. In a stamp-canceling machine, a printing disk, an opening in the periphery of the disk, a circular series of types for printing the hours, means for successively bringing the types in alignment with the opening, an arm for passing each type through the said opening into printing position, two types for printing "A. M." and "P. M." respectively pivotally mounted on said arm and mechanism for operating said means and said arm including a device for automatically bringing one of said two types into printing operation with each of the hour types and then bringing the other of said two types into printing operation with each of the hour types.

21. In a stamp-canceling machine, a printing disk, an opening in the periphery of the disk, a circular series of types for printing the hours, means for successively bringing the types in alignment with the opening, an arm for passing each type through the said opening into printing position, a frame carrying two types of printing "A. M." and "P. M." respectively, pivotally mounted on said arm, and mechanism operable during the rotation of the disk for actuating said means and said arm to successively bring the hour types and one of said two types into printing position, and abutments on the type "12" and on the said frame for automatically shifting the frame to change the types thereon every time the type "12" comes into printing position.

22. In a stamp-canceling machine, a printing disk, a plurality of openings in the periphery of the disk, a circular series of types including a like plurality of sets of types for printing the hours, means for successively bringing corresponding types of the different sets in regular sequence into alignment with the respective openings; an arm for passing one type through each opening, a frame carrying two types "A. M." and "P. M." pivotally mounted on each arm, and mechanism for operating said means and said arms to successively bring the hour types of each set into printing position in said openings together with one of said two types and abutments on the type "12" of each set and each of said frames for automatically shifting the said frames to change the types thereon every time the type "12" comes into alignment with an opening.

23. In a stamp-canceling machine, a printing disk, a plurality of feed rollers and mechanism for separately feeding pieces toward the disk, means for imparting to said rollers and the disk substantially the same peripheral speed, another feed roller between the said feed rollers and the disk and means for imparting to the said other feed roller a peripheral speed in excess of the peripheral speed of the disk.

In testimony whereof, I affix my signature.
JOSEPH OMER LAMOUREUX.